US009036192B2

(12) United States Patent
Watanabe et al.

(10) Patent No.: US 9,036,192 B2
(45) Date of Patent: May 19, 2015

(54) IMAGE PROCESSING SYSTEMS THAT ESTABLISH CONNECTIONS USING DIFFERENT COMMUNICATION PROTOCOLS, DATA PROCESSING APPARATUSES THAT ESTABLISH CONNECTIONS USING DIFFERENT COMMUNICATION PROTOCOLS, AND COMPUTER-READABLE MEDIA STORING INSTRUCTIONS FOR SUCH DATA PROCESSING APPARATUSES

(71) Applicants: Junji Watanabe, Nagoya (JP); Naoki Nishikawa, Nagoya (JP)

(72) Inventors: Junji Watanabe, Nagoya (JP); Naoki Nishikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/090,153

(22) Filed: Nov. 26, 2013

(65) Prior Publication Data
US 2014/0153017 A1 Jun. 5, 2014

(30) Foreign Application Priority Data
Nov. 30, 2012 (JP) ................................. 2012-262028

(51) Int. Cl.
*G06F 3/12* (2006.01)
*H04B 5/00* (2006.01)
*H04N 1/00* (2006.01)

(52) U.S. Cl.
CPC .......... *H04N 1/00095* (2013.01); *G06F 3/1212* (2013.01); *G06F 3/1236* (2013.01); *G06F3/1292* (2013.01); *H04N 2201/006* (2013.01); *H04N 1/00222* (2013.01); *H04N 2201/0044* (2013.01); *H04N 2201/0055* (2013.01); *H04N 2201/0094* (2013.01)

(58) Field of Classification Search
None
See application file for complete search history.

(56) References Cited

U.S. PATENT DOCUMENTS

2009/0036056 A1\* 2/2009 Oshima et al. ............... 455/41.3
2009/0103124 A1\* 4/2009 Kimura et al. ............... 358/1.15

(Continued)

FOREIGN PATENT DOCUMENTS

JP 2007-166538 A 6/2007
JP 2011-146991 A 7/2011

OTHER PUBLICATIONS

European Patent Office, extended European Search Report for European Patent Application No. 13195147.7 (counterpart European patent application), dated May 2, 2014.

*Primary Examiner* — Miya J Cato
(74) *Attorney, Agent, or Firm* — Baker Botts L.L.P.

(57) ABSTRACT

Image processing systems include image processing apparatuses and information processing apparatuses. Image processing apparatuses include image processing devices, which perform image processing for printing print image data, generating scanning image data, or both; and first and second communication devices, which communicate using first and second communication protocols, respectively. Information processing apparatuses include third and fourth communication devices, which communicate using the first and second communication protocols, respectively. First and third communication devices communicate therebetween using the first communication protocol to transmit connection information. Image processing apparatuses, information processing apparatuses, or both determine whether an image transmission condition for transferring the image data between second and fourth communication devices is satisfied. Second and fourth communication devices use connection information to establish communication therebetween using the second communication protocol in response to the determining that the image transmission condition is satisfied and transmit the image data therebetween using the second communication protocol.

14 Claims, 17 Drawing Sheets

(56) References Cited

U.S. PATENT DOCUMENTS

| | | |
|---|---|---|
| 2010/0245880 A1 | 9/2010 | Miura |
| 2011/0177780 A1 | 7/2011 | Sato et al. |
| 2012/0162712 A1 | 6/2012 | Shibao |
| 2014/0063537 A1* | 3/2014 | Nishikawa et al. .......... 358/1.15 |
| 2014/0104635 A1* | 4/2014 | Nishikawa ................... 358/1.14 |
| 2014/0118769 A1* | 5/2014 | Adachi et al. ................ 358/1.13 |

* cited by examiner

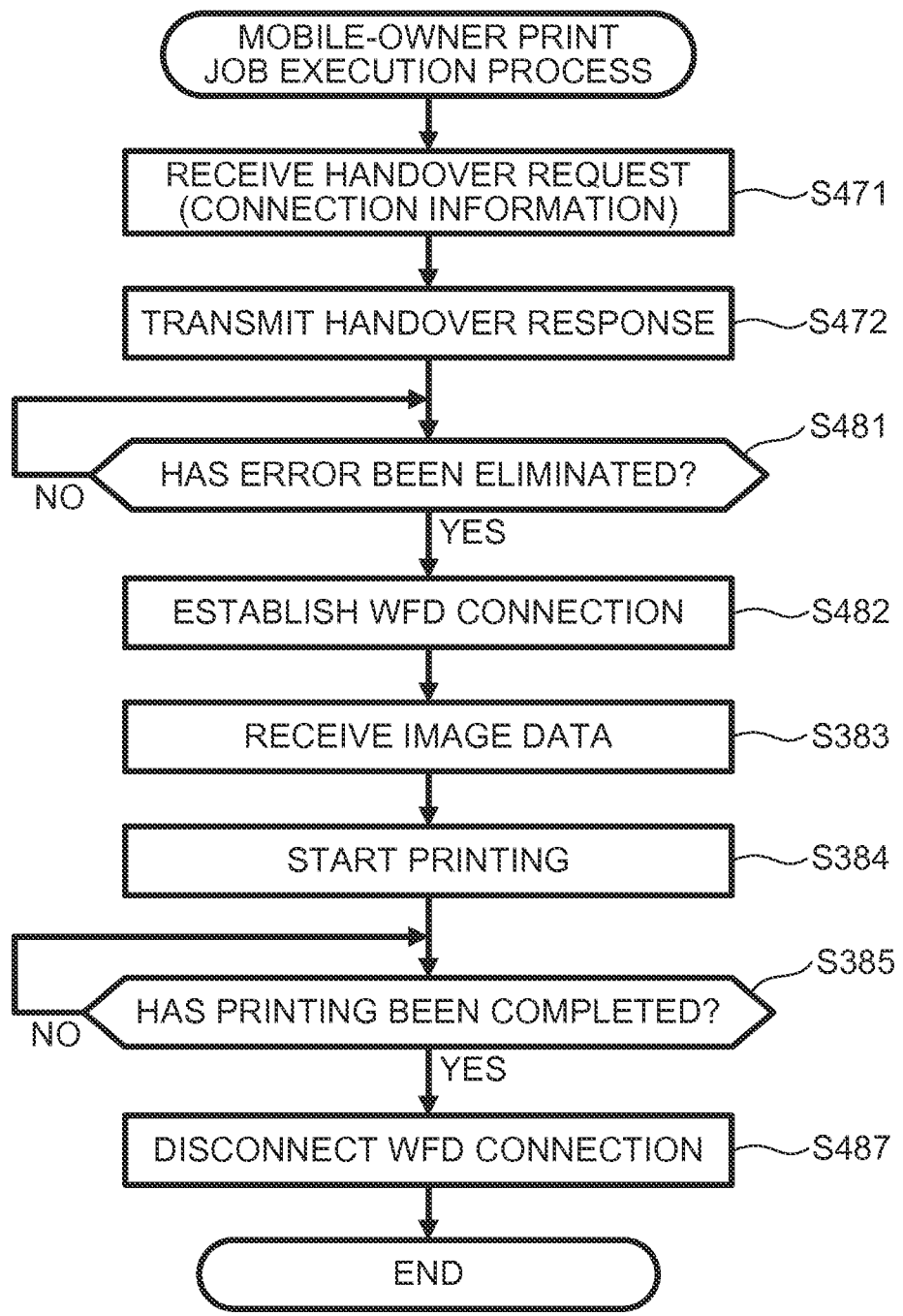

IMAGE PROCESSING SYSTEMS THAT ESTABLISH CONNECTIONS USING DIFFERENT COMMUNICATION PROTOCOLS, DATA PROCESSING APPARATUSES THAT ESTABLISH CONNECTIONS USING DIFFERENT COMMUNICATION PROTOCOLS, AND COMPUTER-READABLE MEDIA STORING INSTRUCTIONS FOR SUCH DATA PROCESSING APPARATUSES

CROSS-REFERENCE TO RELATED APPLICATION

This application claims priority from Japanese Patent Application No. 2012-262028, filed on Nov. 30, 2012, the disclosure of which is incorporated herein by reference.

BACKGROUND OF THE DISCLOSURE

1. Field of the Disclosure

The invention relates to an image processing system, an image processing apparatus, and an information processing apparatus. More specifically, the invention relates to a technique of executing a job through data communication performed between an image processing apparatus and an information processing apparatus using a plurality of wireless communication protocols.

2. Description of the Related Art

Recently, a plurality of wireless communication protocols, such as a Bluetooth® protocol (Bluetooth® is a registered trademark owned by BLUETOOTH SIG. INC. of Kirkland, Wash.), a Wireless Fidelity ("Wi-Fi®") protocol (Wi-Fi® is a registered certification mark owned by the Wi-Fi Alliance of Austin, Tex.), and a Near Field Communication ("NFC") protocol, have been made available for wireless communication between an electronic device, such as a smartphone or a tablet personal computer ("PC"), and an image processing apparatus, such as a scanner or a printer. In a known method of wireless communication, the NFC protocol is used first to transmit one of authentication information and setting information, and then, the wireless communication protocol is changed from the NFC protocol to another wireless communication protocol that has a longer communication range and offers higher-speed communication than the NFC protocol. The above-described technique of changing the wireless communication protocol is referred to as a handover technique.

In the known handover technique, the communication device obtains a communication protocol and an encryption method via short-range wireless communication from the other communication device. When the obtained communication protocol and encryption method match with the communication protocol and encryption method specified in the communication device, data communication is performed between the communication device and the other communication device using the obtained communication protocol and encryption method.

SUMMARY OF THE DISCLOSURE

The known handover technique has at least the following problem. In a system using the known handover technique, the currently-used communication protocol may be changed to another communication protocol immediately after the information necessary to change the communication protocol is transmitted. Therefore, it may take a greater amount of time to start using the wireless communication protocol because, for example, a greater amount of time may be required to generate communication target data. Thus, the communication devices may connect with each other unnecessarily, resulting in an increase of a load on the system.

Accordingly, aspects of the invention may address the above-described problem of the known handover technique. That is, aspects of the invention provide for an image processing system, an image processing apparatus, and an information processing apparatus that may reduce a load on wireless communication using a changed communication protocol.

Image processing systems disclosed herein may comprise an image processing apparatus and an information processing apparatus. The image processing apparatus may comprise a first communication device, a second communication device, and an image processing device. The first communication device may be configured to communicate using a first communication protocol. The second communication device may be configured to communicate using a second communication protocol. The image processing device may be configured to perform image processing for printing print image data, which is transmitted from the information processing apparatus. Alternatively or additionally, the image processing device may be configured to perform image processing for generating scanning image data, which is read from a document and transmitted to the information processing apparatus. The information processing apparatus may comprise a third communication device and a fourth communication device. The third communication device may be configured to communicate using the first communication protocol. The fourth communication device may be configured to communicate using the second communication protocol. The first communication device and the third communication device may be configured to communicate therebetween using the first communication protocol to transmit connection information between the first communication device and the third communication device. The connection information may comprise information for establishing communication using the second communication protocol. The image processing apparatus may be configured to determine whether an image transmission condition for transferring at least one of the print image data and the scanning image data between the second communication device and the fourth communication device is satisfied. Alternatively or additionally, the information processing apparatus may be configured to determine whether an image transmission condition for transferring at least one of the print image data and the scanning image data between the second communication device and the fourth communication device is satisfied. The second communication device and the fourth communication device may be configured to use the connection information to establish communication therebetween using the second communication protocol in response to the at least one of the image processing apparatus and the information processing apparatus determining that the image transmission condition is satisfied. The second communication device and the fourth communication device may be configured to transmit at least one of the print image data and the scanning image data therebetween using the second communication protocol after the communication between the second communication device and the fourth communication device using the second communication protocol is established.

Data processing apparatuses disclosed herein may comprise a controller, a communication device, and an other communication device. The controller may comprise one or more control devices. The communication device may be configured to communicate using a first communication protocol. The other communication device may be configured to communicate using a second communication protocol. The controller may be configured to control the communication device to communicate with an external device using the first communication protocol to transmit connection information between the communication device and the external device. The connection information may comprise information for establishing communication using the second communication protocol. The controller may be configured to determine whether an image transmission condition for transferring image data between the data processing apparatus and the external device is satisfied. The controller may be configured to control the other communication device to communicate with the external device using the second communication protocol after the connection information is used to establish communication between the other communication device and the external device using the second communication protocol in response to the controller determining that the image transmission condition is satisfied. The communication between the other communication device and the external device using the second communication protocol may comprise transmitting the image data from the other communication device to the external device. Alternatively or additionally, the communication between the other communication device and the external device using the second communication protocol may comprise receiving the image data by the other communication device from the external device.

Non-transitory computer-readable media disclosed herein may store computer-readable instructions thereon. The computer-readable instructions may, when executed by a processor of a data processing apparatus, instruct the processor to perform certain processes. The certain processes may comprise a process of controlling a communication device to communicate with an external device using the first communication protocol to transmit connection information between the communication device and the external device. The connection information may comprise information for establishing communication using the second communication protocol. The certain processes may comprise a process of determining whether an image transmission condition for transferring image data between the data processing apparatus and the external device is satisfied. The certain processes may comprise a process of controlling an other communication device to communicate with the external device using the second communication protocol after the connection information is used to establish communication between the other communication device and the external device using the second communication protocol in response to determining that the image transmission condition is satisfied. The communication between the other communication device and the external device using the second communication protocol may comprise transmitting the image data from the other communication device to the external device. Alternatively or additionally, the communication between the other communication device and the external device using the second communication protocol may comprise receiving the image data by the other communication device from the external device.

In the image processing system disclosed herein, both of the image processing apparatus and the information processing apparatus may support both of the short-range communication that may be wireless communication in compliance with the first communication protocol and long-range communication that may be wireless communication in compliance with the second communication protocol. Further, in the image processing system disclosed herein, the connection information to be used for the establishment of long-range communication may be transmitted between the image processing apparatus and the information processing apparatus via short-range communication. After the connection information is transmitted, long-range communication may be established between the image processing apparatus and the information processing apparatus through the use of the connection information when it is determined that the image transmission condition for transmitting image data is satisfied. The image transmission condition may comprise, for example, one or more of a completion of document reading, a completion of generation of image data for printing, an elapse of a predetermined waiting time, and an elapse of waiting time based on the image processing settings.

That is, an unnecessary connection using long-range communication may increase a load on long-range communication (e.g., the unnecessary connection using long-range communication may interrupt a connection of another device with the image processing apparatus). Therefore, it may be beneficial to reduce the establishment of the unnecessary connection. Thus, in the image processing system disclosed herein, long-range communication may be established when the image transmission condition for transmitting image data is satisfied instead of immediately after the connection information is transmitted via short-range communication. Accordingly, the time in which a connection using long-range communication is established may be shortened or reduced for the waiting time that elapses before the transmission of image data is started.

According to the aspects of the invention, an image processing system, an image processing apparatus, and an information processing apparatus that reduce a load on wireless communication using a changed communication protocol may be implemented.

Other objects, features, and advantages will be apparent and persons of ordinary skill in the art from the following description of the disclosure and the accompanying drawings.

BRIEF DESCRIPTION OF THE DRAWINGS

For a more complete understanding of the present invention, needs satisfied thereby, and the objects, features, and advantages thereof, reference now is made to the following descriptions taken in connection with the accompanying drawings.

FIG. 17 is a flowchart depicting an example mobile-owner print job execution process performed by the mobile device in the process of data communication shown in FIG. 11.

DETAILED DESCRIPTION OF EMBODIMENTS

Hereinafter, an image processing system according to illustrative configurations is described in detail with reference to the accompanying drawings. In particular configurations, the aspects of the invention may be applied to an image processing system comprising a multifunction peripheral ("MFP") configured to perform a scanning function and a printing function and a mobile device configured to accept a job for allowing the MFP to perform image processing.

Figure 1:
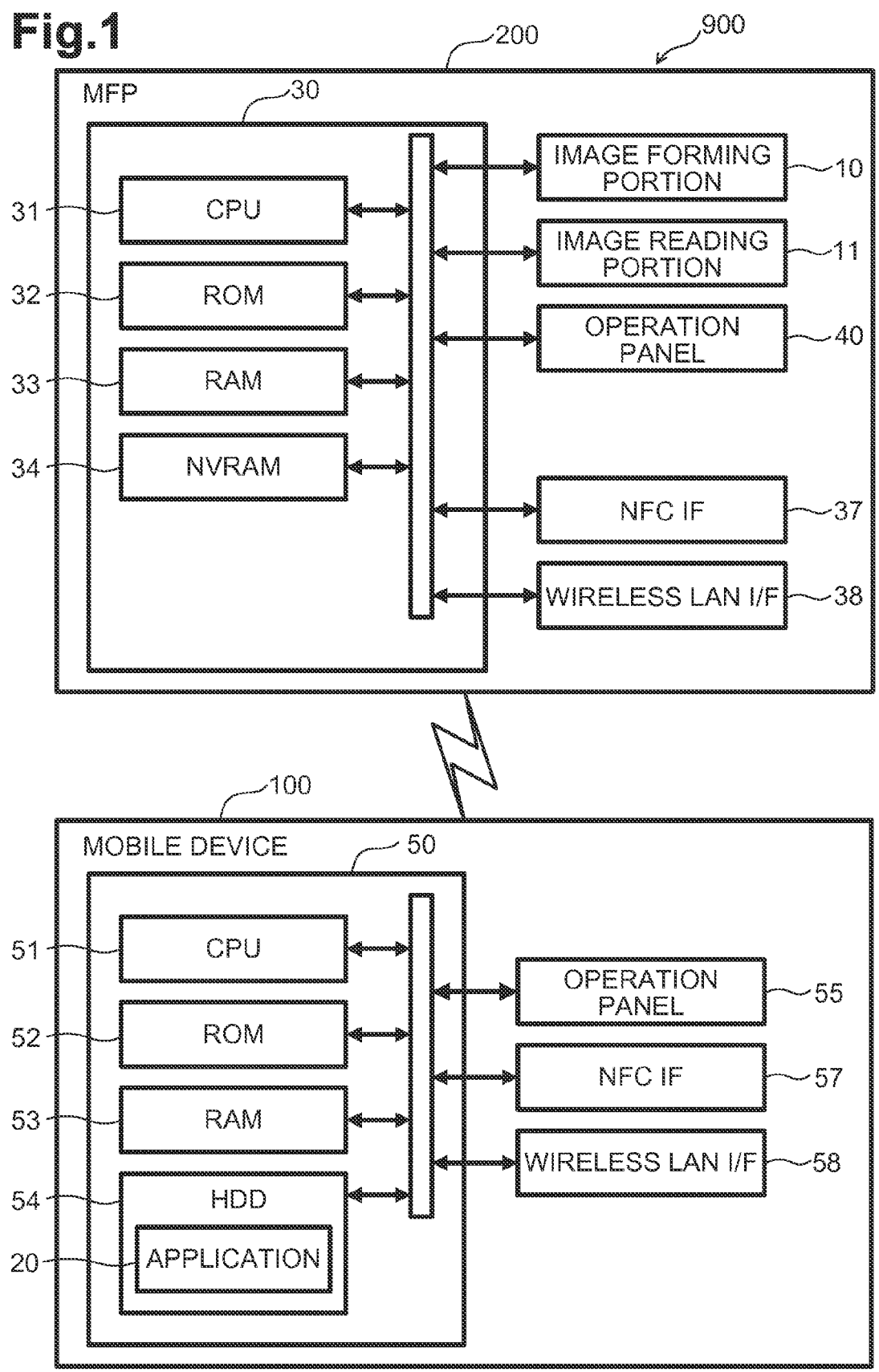
FIG. 1 is a block diagram showing an example configuration of an image processing system.

As shown in FIG. 1, an image processing system 900 (an example of an image processing system) according to particular configurations may comprise a mobile device 100 (an example of an information processing apparatus) and an MFP 200 (an example of an image processing apparatus). The mobile device 100 may be configured to output a job to a specified MFP, such as the MFP 200, for example. The MFP 200 may be configured to execute a job. In the image processing system 900, at least one of data transmission and reception may be available between the mobile device 100 and the MFP 200 via wireless communication.

One or more information processing apparatuses, through which a job that instructs the MFP 200 to perform image processing may be placed, may be included in the image processing system and connected to the MFP 200, as well as to the mobile device 100. Further, one or more servers or access points may be connected to the image processing system 900, and communication may be performed between the mobile device 100 and the MFP 200 via the one or more servers or access points.

A general configuration of the MFP 200 now is described. As shown in FIG. 1, the MFP 200 may comprise, for example, a central processing unit ("CPU") 31 (an example of a control device), a read-only memory ("ROM") 32, a random-access memory ("RAM") 33 (an example of an image-processing-side storage device), and a nonvolatile random-access memory ("NVRAM") 34. The MFP 200 may further comprise an image forming portion 10 (an example of an image processing device), an image reading portion 11 (another example of the image processing device), an operation panel 40, an NFC interface ("I/F") 37 (an example of a first communication device), and a wireless local-area network ("LAN") I/F 38 (an example of a second communication device), which may be controlled by the CPU 31. The image forming portion 10 may be configured to print an image onto a sheet. The image reading portion 11 may be configured to read an image from a document. The operation panel 40 may be configured to display operating statuses and to accept an input operation.

The image forming portion 10 may be configured to perform at least one of color printing and monochrome printing. Further, the image forming portion 10 may be configured to perform printing by using at least one of an electrophotographic method and an inkjet method. Moreover, the image reading portion 11 may be configured to perform one of color scanning and monochrome scanning. A scanning mechanism may utilize at least one of a charge-coupled device ("CCD") and a contact image sensor ("CIS").

The ROM 32 may be configured to store various settings and firmware such as various control programs for controlling the MFP 200, as well as certain initial values. The RAM 33 and the NVRAM 3 may be used as workspaces, respectively, for temporarily storing the control programs read from the ROM 32 or as storage areas, respectively, for temporarily storing data.

The CPU 31 may store processing results in at least one of the RAM 33 and the NVRAM 34, in response to executing various programs read from the ROM 32, the programs read from the NVRAM 34, and signals sent from sensors.

The NFC I/F 37 may enable the MFP 200 to perform wireless communication using an NFC protocol in compliance with the International standards, e.g., ISO/IEC 21481 and ISO/IEC 18092 as defined by the International Organization for Standardization). The MFP 200 may be configured to transmit data, to receive data, or via the NFC I/F 37, to or from an external device.

The wireless LAN I/F 38 may enable the MFP 200 to perform wireless communication using a Wi-Fi Direct ("WFD") protocol in compliance with the IEEE 802.11 standard and the related family of standards defined by the Institute of Electrical and Electronics Engineers ("IEEE"). The NFC protocol and the WFD protocol may utilize different communication protocol (e.g., standards for wireless communication). For example, the communication protocol of the WFD protocol may enable a greater communication range and a faster communication speed than the communication protocol of the NFC protocol. The MFP 200 may be configured to transmit data, to receive data, or both, via the wireless LAN I/F 38, to or from an external device.

In the WFD protocol, a network may be configured between a device, which may serve as a group owner and manage the network (hereinafter, referred to as a "group-owner-status device"), and a device which may serve as a client (hereinafter, referred to as a "client-status device"). The WFD protocol may utilize a communication protocol that may allow transmission and reception of data between the group-owner-status device and the client-status device in the network. Therefore, for the MFP 200 to perform data communication with an external device via the wireless LAN I/F 38, the MFP 200 may need to configure a WFD) network with the external device by establishing wireless communication with the external device. For example, the MFP 200 may serve as the group owner and the mobile device 100 may serve as the client when the WFD network is configured. The group-owner-status device may be configured to store identifying information of the client-status device and connection information for establishing wireless communication using the WFD system with the client-status device. The connection information may comprise, for example, a service set identifier ("SSID"), which may be an identifier for identifying a WFD network, and a password.

Figure 2:
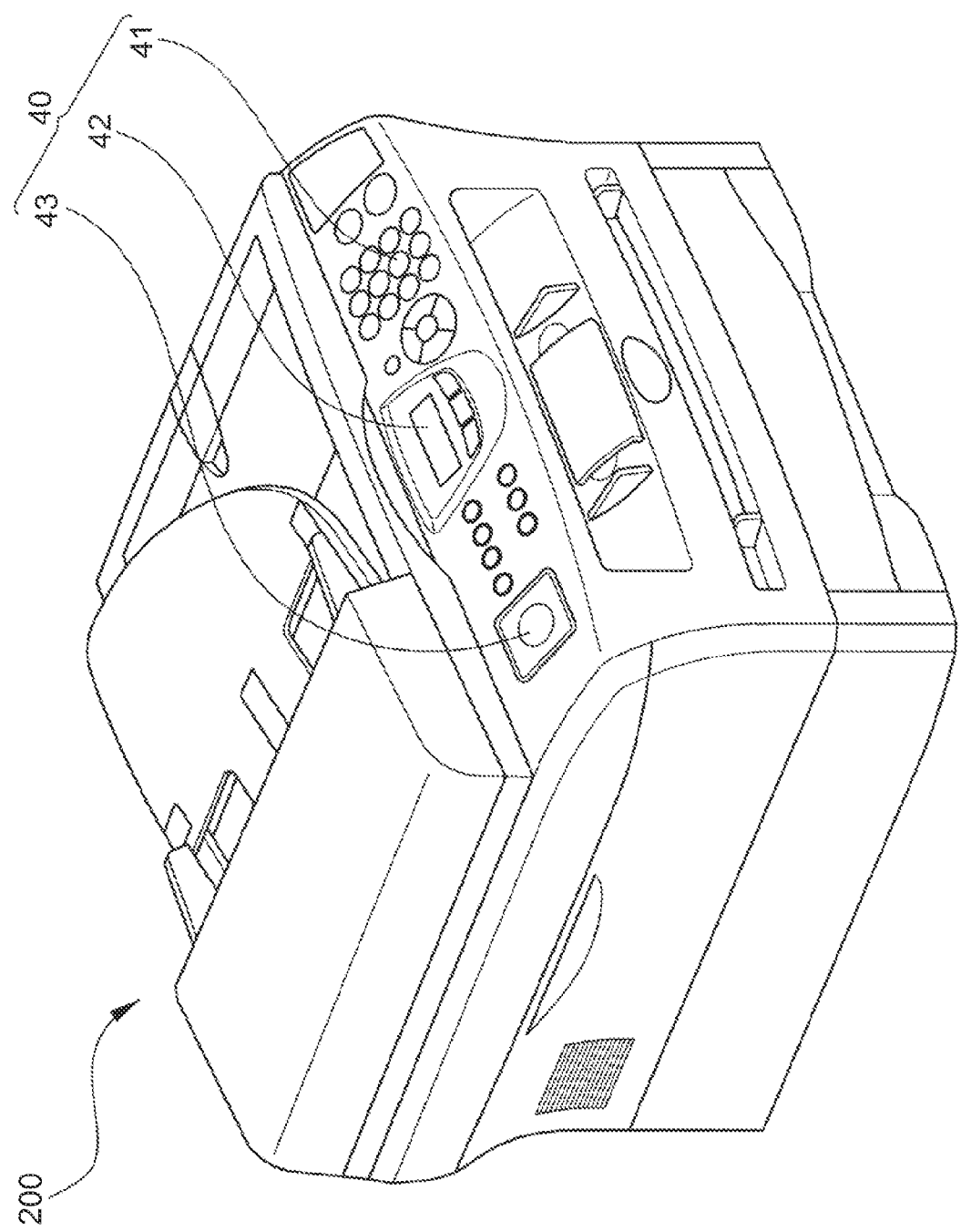
FIG. 2 is a perspective view showing an example configuration of a multifunction peripheral ("MFP").

As shown in FIG. 2, the operation panel 40 may be disposed on the exterior of the MFP 200 and may comprise an input portion 41 and a display 42. The input portion 41 may comprise various buttons for accepting inputs. The display 42 may be configured to display various messages and details of settings. The various buttons may comprise, for example, an OK button for instructing a start of image processing and a cancel button for instructing a cancel of image processing.

The operation panel 40 may further comprise an NFC reader 43 for establishing wireless communication using the NFC protocol. The NFC reader 43 may comprise the NFC I/F 37. While the power of the MFP 200 is on, the MFP 200 may be in a state of readiness to detect a device that may perform wireless communication using the NFC protocol (hereinafter, referred to as an "NFC-enabled device"), by using signals issued from the NFC I/F 37. For example, when the mobile device 100 is held over the NFC reader 43, the MFP 200 may detect the mobile device 100, and wireless communication using the NFC protocol between the mobile device 100 and the MFP 200 may be enabled automatically. Holding the mobile device 100 over the NFC reader 43 may be sufficient to dispose the mobile device 100 within a communicable range of the NFC I/F 37, and thus, it may be unnecessary for the mobile device 100 and the NFC reader 43 to be in contact with each other.

A general configuration of the mobile device 100 is now described. As shown in FIG. 1, the mobile device 100 may comprise a CPU 51 (an example of a control device), a ROM 52, a RAM 53 (an example of an information-processing-side storage device), and a hard disk drive ("HDD") 54. The mobile device 100 may further comprise a touch-sensitive operation panel 55, an NFC I/F 57 (an example of a first communication device), and a wireless LAN I/F 58 (an example of a second communication device), which may be controlled by the CPU 51. The operation panel 55 may be configured to perform a display function and an input function. The NFC I/F 57 may be a communication interface that may allow the mobile device 100 to perform communication with the external device.

The HDD 54 of the mobile device 100 may store an operating system ("OS"), browsers for browsing files on the Internet, and device drivers for controlling various devices. The HDD 54 may also store an application program (hereinafter, referred to as an "application 20") that may enable the mobile device 100 to accept a job that ultimately instructs the MFP 200 to perform image processing, such as one or more of printing and scanning, for example, and that may control the mobile device 100 to transmit image data accompanied by the image processing to the MFP 200.

Figure 3:
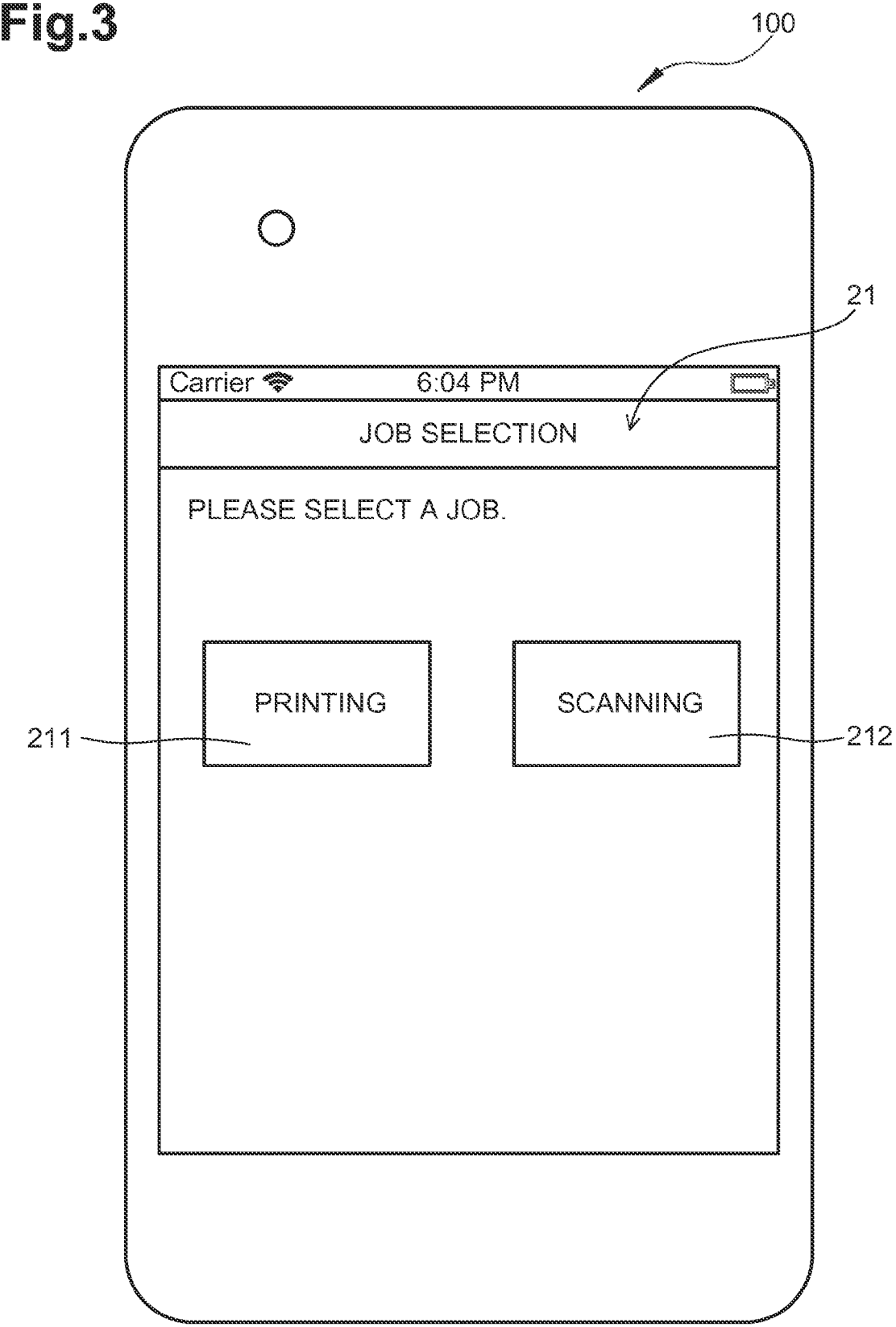
FIG. 3 is a schematic diagram showing an example of an initial screen of an application installed on a mobile device.

The above-described application 20 may be started by the CPU 51 when the mobile device 100 receives a start instruction. As shown in FIG. 3, the application 20 may display a selection screen 21, as an initial screen, which may allow the selection of a job type. Jobs that the application 20 may accept may comprise, for example, a print job and a scan job. A "PRINTING" button 211 for accepting a selection of a print job and a "SCANNING" button 212 for accepting a selection of a scan job may be displayed on the selection screen 21.

When the "SCANNING" button 212 is touched, the application 20 may place a scan job in a job queue of the mobile device 100. As the scan job is placed, the application 20 may display a message indicating that the mobile device 100 is to be held over the NFC reader portion 43 of the MFP 200.

When the "PRINTING" button 211 is touched, the application 20 may change the selection screen 21 to a print target selection screen (not shown) to accept a selection of data to be printed (also, referred to as a "print target data") and an instruction to execute printing. The print target selection screen may display, for example, names or thumbnail images of data in a list form, and an execution button for instructing the print execution. When data desired to be printed is selected (e.g., touched), the print target data may be selected. When the user touches the execution button with the data selected, a print job may be placed in the job queue of the mobile device 100. As the print job is placed, the application 20 may display a message indicating that only mobile device 100 is to be held over the NFC reader portion 43 of the MFP 200. Operations after one of a print job and a scan job is placed are described in detail later.

The CPU 51 may store processing results in the RAM 53 or the HDD 54 in response to executing various programs read from one or more of the ROM 52 and the HDD 54. The operations of the application 20 may be processed by the CPU 51 in certain configurations.

Similar to the NFC interface 37 of the MFP 200, the NFC I/F 57 may allow the mobile device 100 to perform wireless communication using the NFC protocol. Similar to the wireless LAN I/F 38 of the MFP 200, the wireless LAN I/F 58 may allow the mobile device 100 to perform wireless communication using the WFD system. The mobile device 100 may be configured to transmit data, to receive data, or both, to or from the external device via one of the NFC I/F 57 and the wireless LAN I/F 58.

A procedure for performing data communication between the mobile device 100 and the MFP 200 after a scan job is placed in the mobile device 100 via the application 20 now is described. The procedure for performing data communication may differ according to whether the mobile device 100 serves as the group owner or the MFP 200 serves as the group owner when wireless communication using the WFD protocol is performed. Therefore, operations performed when the MFP 200 serves as the group owner is described with respect to particular configurations, and operations performed when the mobile device 100 serves as the group owner is described later with respect to such configurations.

Figure 4:
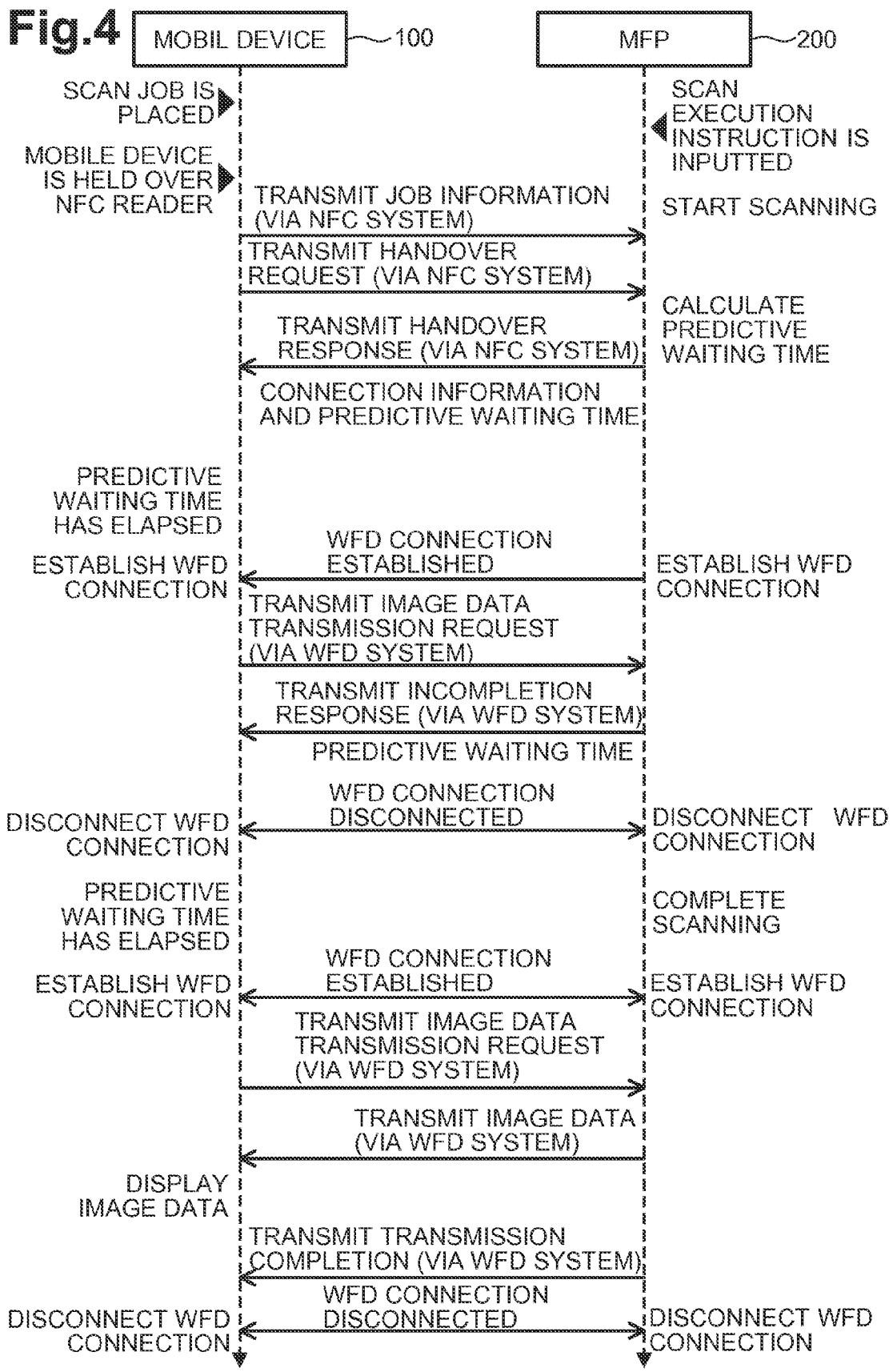
FIG. 4 is a sequence diagram showing an example process of data communication performed between the mobile device and the MFP during a scanning process, wherein the MFP serves as a group owner.

Particular configurations in which the MFP 200 may serve as the group owner now are described with reference to a sequence diagram shown in FIG. 4. The mobile device 100 may be held over the NFC reader portion 43 of the MFP 200 while a scan job is placed in the mobile device 100. By doing so, the MFP 200 may detect the mobile device 100, and thus, wireless communication using the NFC protocol may become available between the mobile device 100 and the MFP 200.

When the wireless communication using the NFC protocol becomes available between the mobile device 100 and the MFP 200, job information identifying one or more of a scan job and a print job may be transmitted. Thus, the MFP 200 may identify the type of the job requested by the mobile device 100. In other configurations, for example, the job information may comprise details of job settings as well as the information identifying the job type. The job information may be transmitted via wireless communication using the NFC protocol.

When the wireless communication using the NFC protocol becomes available between the mobile device 100 and the MFP 200, the mobile device 100 may transmit a handover request to the MFP 200. The handover request may also be transmitted via the wireless communication using the NFC protocol.

Upon receipt of the handover request from the mobile device 100, the MFP 200 may calculate a predictive waiting time that may be required to complete scanning, based on, for example, the details of the job settings, an execution progress of the scan job, and processing performance of the image reading portion 11. Thereafter, the MFP 200 may transmit a handover response to the mobile device 100. The calculated predictive waiting time and connection information for establishing wireless communication using the WFD system may be added to the handover response. The handover response may also be transmitted via wireless communication using the NFC protocol.

Further, the MFP 200 may accept an input of a scan execution instruction through an operation performed on the operation panel 40. After accepting the input of the scan execution instruction, the MFP 200 may start scanning one or more documents in the image reading portion 11. The scan execution instruction may be inputted before or after the mobile device 100 is held over the NFC reader 43. When scanning has not been started in the MFP 200 at the time of transmitting the handover response, the MFP 200 may provide an instruction prompting for the input of a scan execution instruction. When one or more documents have been loaded at the time of transmitting the handover response, the MFP 200 may start scanning automatically. The instruction may be provided through one or more message displayed on the operation panel 40, a voice message, and an output of an instruction to display a message to the mobile device 100 from the MFP 200.

Upon receipt of the handover response, the mobile device 100 may wait until the predictive waiting time has elapsed. After the predictive waiting time has elapsed, the mobile device 100 may request the MFP 200 to establish a connection using the WFD protocol (also, referred to as a "WFD connection") with the mobile device 100. Thus, the mobile device 100 may use the connection information to establish wireless communication using the WFD protocol with the MFP 200. After establishing the wireless communication using the WFD protocol, the mobile device 100 may transmit an image data transmission request to the MFP 200.

When the MFP 200 establishes the wireless communication with the mobile device 100, the MFP 200 may accept the image data transmission request. As the MFP 200 accepts the image data transmission request, the MFP 200 may determine whether scanning has proceeded to a certain degree or more. When scanning has not proceeded to a certain degree or more, the MFP 200 may recalculate a new predictive waiting time and transmit a response indicating that scanning has not been completed yet (hereinafter, referred to as an "incompletion response") to the mobile device 100. The new predictive waiting time may be added to the response. When scanning has proceeded to a certain degree or more, the MFP 200 may start the transmission of image data. When the transmission of the image data is completed, the MFP 200 may transmit a transmission completion response to the mobile device 100. One or more of the incompletion response, the image data, and the transmission completion response may be transmitted by the MFP 200 via wireless communication using the WFD system.

When the mobile device 100 receives an incompletion response, the mobile device 100 may disconnect the wireless communication using the WFD protocol established with the MFP 200 and wait until the new predictive waiting time has elapsed. After the new predictive waiting time has elapsed, the mobile device 100 may request the MFP 200 again to establish a connection using the WFD protocol with the mobile device 100. When the mobile device 100 receives image data, the mobile device 100 may display the received image data on the application 20. When the mobile device 100 receives a transmission completion response, the mobile device 100 may disconnect the wireless communication using the WFD protocol established with the MFP 200. Thus, a series of operations for the scan job may be completed.

Figure 5:
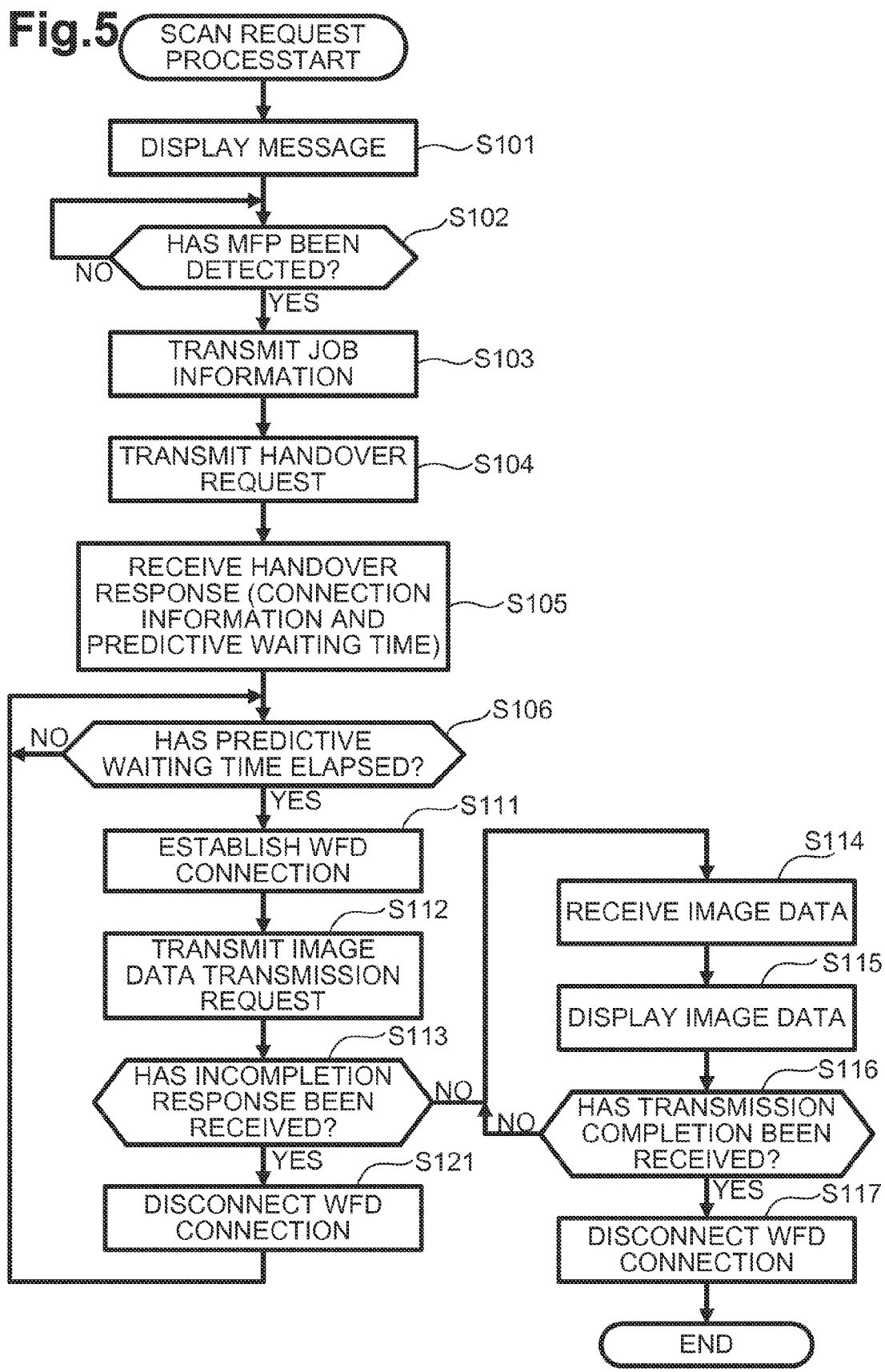
FIG. 5 is a flowchart showing an example scan request process performed by the mobile device in the process of data communication shown in FIG. 4.

A scan request process performed by the mobile device 100 to implement the operations for the scan job now is described with reference to a flowchart shown in FIG. 5. The scan request process may be performed by the CPU 51 when the "SCANNING" button 212 of the application 20 is touched.

In the scan request process, the CPU 51 may display a message prompting for the mobile device 100 to be held over the NFC reader portion 43 of the MFP 200 (e.g., step S101). Subsequent to step S101, the CPU 51 may determine whether an MFP 200 that may be a destination of a scan job has been detected (e.g., step S102). The CPU 51 may receive a connection confirmation from the MFP 200 while the mobile device 100 is held over the NFC reader 43 of the MFP 200. When the CPU 51 determines that the mobile device 100 has received the connection confirmation, the CPU 51 may determine that the destination MFP 200 has been detected. While the destination MFP 200 is not detected (e.g., NO in step S102), the routine may wait until the CPU 51 determines that the destination MFP 200 has been detected.

When the CPU 51 determines that the destination MFP 200 has been detected (e.g., YES in step S102), the CPU 51 may transmit job information to the MFP 200 via the NFC I/F 57 (e.g., step S103). Further, the CPU 51 may transmit a handover request to the MFP 200 (e.g., step S104).

Subsequent to step S104, the CPU 51 may receive a handover response from the MFP 200 (e.g., step S105). The predictive waiting time required to complete scanning in the MFP 200 and the connection information utilized to establish a connection using the WFD system may be added to the handover response.

Subsequent to step S105, the CPU 51 may determine whether an elapsed time from the receipt of the handover response has exceeded the predictive waiting time, that is, whether the predictive waiting time has elapsed (e.g., step S106). When the CPU 51 determines that the predictive waiting time has not elapsed (e.g., NO in step S106), the routine may wait until the CPU 51 determines that the predictive waiting time has elapsed.

When the CPU 51 determines that the predictive waiting time has elapsed (e.g., YES in step S106), the CPU 51 may use the connection information received in step S105 to establish wireless communication using the WFD protocol with the MFP 200 (e.g., step S111). After the wireless communication using the WFD protocol is established, the CPU 51 may transmit an image data transmission request to the MFP 200 (e.g., step S112).

Subsequent to step S112, the CPU 51 may determine whether an incompletion response has been received from the MFP 200 (e.g., step S113). When the CPU 51 determines that an incompletion response has been received (e.g., YES in step S113), the CPU 51 may transmit a disconnection confirmation to the MFP 200 to disconnect the wireless communication using the WFD protocol (e.g., step S121). The routine may proceed to step S106 and wait until the CPU 51 determines that the new predictive waiting time added to incompletion response has elapsed.

When the CPU 51 determines that an incompletion response has not been received (e.g., NO in step S113), the CPU 51 may receive image data because the image data has been transmitted from the MFP 200 (e.g., step S114). Therefore, the CPU 51 may display the received image data on a screen of the operation panel 55 via the application 20 (e.g., step S115). When the image data is displayed in step S115, all pages may be displayed by batch after the CPU 51 determines that all the pages have been received in step S114 or may be displayed one by one repeatedly every time the receipt of one page is completed in step S114 until all the pages are displayed.

After the receipt of the image data is started, the CPU 51 may determine whether a transmission completion response has been received from the MFP 200 (e.g., step S116). When the CPU 51 determines that a transmission completion has not been received (e.g., NO in step S116), the routine may proceed to step S114 and the CPU 51 may repeat the receipt of the image data until the CPU 51 determines that a transmission completion response has been received. When the CPU 51 determines that a transmission completion response has been received (e.g., YES in step S116), the CPU 51 may transmit a disconnection confirmation to the MFP 200 to disconnect the wireless communication using the WFD protocol (e.g., step S117). Subsequent to step S117, the CPU 51 may end the scan request process.

Figure 6:
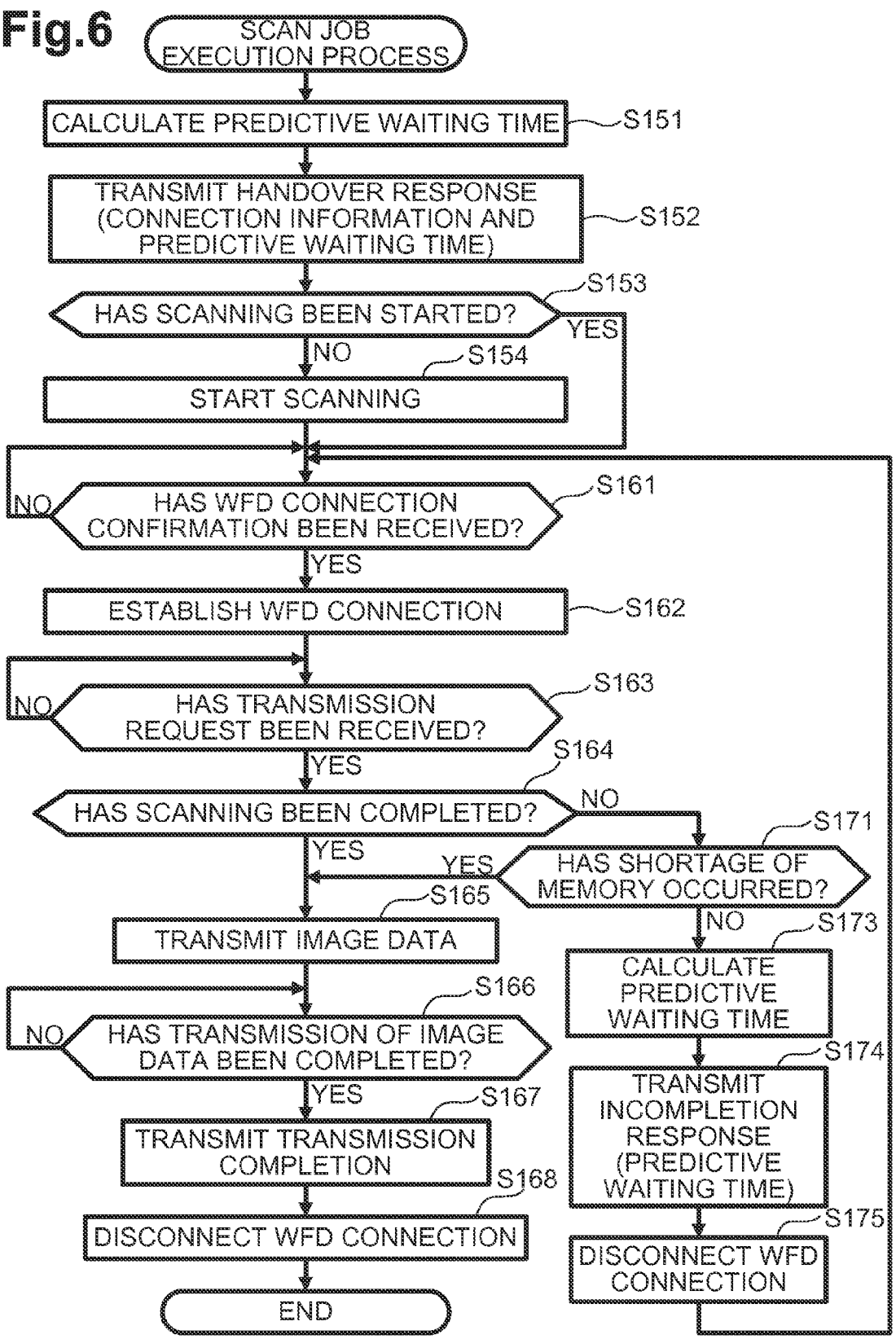
FIG. 6 is a flowchart showing an example scan job execution process performed by the MFP in the process of data communication shown in FIG. 4.

A scan job execution process performed by the MFP 200 to implement the operations for the scan job now is described with reference to a flowchart shown in FIG. 6. The scan job execution process may be performed by the CPU 31 when the CPU 31 detects an NFC-enabled device via the NFC interface 37 and determines that a request to execute a scan job has been made based on the job information transmitted from the mobile device 100. In particular, configurations described below, the detected NFC-enabled device may be the mobile device 100.

In the scan job execution process, the CPU 31 may calculate a predictive waiting time (e.g., step S151). For example, the predictive waiting time may be calculated based on one or more of the details of the scan settings (e.g., one or more of resolution, image quality, reading range specified by the user, and color settings), a reading method (e.g., flatbed reading or automatic document feeder ("ADF") reading), the number of remaining documents to be read, and the processing performance of the image reading portion 11 (e.g., a reading speed). Subsequent to step S151, the CPU 31 may transmit a handover response to the mobile device 100 via the NFC I/F 37 (e.g., step S152). The predictive waiting time that may be the calculation result in step S151 and the connection information to be used for communication using the WFD protocol may be added to the handover response.

Subsequent to step S152, the CPU 31 may determine whether scanning has been started (e.g., step S153). When the CPU 31 determines that scanning has not been started yet (e.g., NO in step S153), the CPU 31 may start scanning after accepting an input of a scan execution instruction (e.g., step S154). When the CPU 31 determines that scanning has not been started yet, for example, the CPU 31 may display, on the operation panel 40, a message indicating that scanning will start. In step S154, the CPU 31 may start scanning automatically on condition where one or more documents are loaded.

Subsequent to step S154, or when the CPU 31 determines that scanning has been started (e.g., YES in step S153), the CPU 31 may determine whether a WFD connection confirmation has been received from the mobile device 100 (e.g., step S161). When the CPU 31 determines that a WFD connection confirmation has not been received (e.g., NO in step S161) the routine may wait until the CPU 31 determines that a WFD connection confirmation has been received. When the CPU 31 determines that a WFD connection confirmation has been received (e.g., YES in step S161), the CPU 31 may establish wireless communication using the WFD protocol with the mobile device 100 (e.g., step S162). That is, a handover of the wireless communication protocol from the NFC protocol to the WFD system may be implemented.

Subsequent to step S162, the CPU 31 may determine whether an image data transmission request has been received (e.g., step S163). When the CPU 31 determines that an image data transmission request has not been received (e.g., NO in step S163), the routine may wait until the CPU 31 determines that an image data transmission request has been received. When the CPU 31 determines that an image data transmission request has been received (e.g., YES in step S163), the CPU 31 may determine whether scanning has been completed (e.g., step S164).

When the CPU 31 determines that scanning has not been completed (e.g., NO in step S164), the CPU 31 may determine whether a shortage of memory has occurred in the MFP 200 (e.g., step S171). In step S171, the CPU 31 may determine how much free space is available in the RAM 33 or in a specific area allocated in the RAM 33 for storage of image data. When the CPU 31 determines that a shortage of memory has occurred (e.g., YES in step S171), the routine may proceed to step S165 and the CPU 31 may start the transmission of the generated image data to free up memory space.

When the CPU 31 determines that a shortage of memory has not occurred (e.g., NO in step S171), the CPU 31 may again calculate a new predictive waiting time (e.g., step S173). Thereafter, the CPU 31 may transmit a scanning incompletion response to the mobile device 100 (e.g., step S174). The CPU 31 may add the predictive waiting time calculated in step S173 to the incompletion response transmitted in step S174. Subsequent to step S174, the CPU 31 may disconnect the wireless communication using the WFD protocol established with the mobile device 100 after receiving a disconnection confirmation from the mobile device 100 (e.g., step S175). After that, the routine may proceed to step S161 and wait until the CPU 31 determines that a WFD connection confirmation has been received.

When the CPU 31 determines that scanning has been completed (e.g., YES in step S164), the CPU 31 may start the transmission of the image data to the mobile device 100 (e.g., step S165). Then, the CPU 31 may determine whether image data of all pages have been transmitted (e.g., step S166). When the CPU 31 determines that image data of all pages have not been transmitted (e.g., NO in step S166), the routine may wait until the CPU 31 determines that image data of all pages have been transmitted. When the CPU 31 determines that image data of all pages have been transmitted (e.g., YES in step S166), the CPU 31 may transmit a transmission completion to the mobile device 100 (e.g., step S167).

Subsequent to step S167, the CPU 31 may disconnect the wireless communication using the WFD protocol established with the mobile device 100 after receiving a disconnection confirmation from the mobile device 100 (e.g., step S168). Subsequent to step S168, the CPU 31 may end the scan job execution process.

As described above, in the operations for the scan job, a handover might not be implemented immediately after the mobile device 100 receives a handover response. Instead, wireless communication using the WFD protocol may be established after the predictive waiting time required to complete scanning elapses. Therefore, this configuration may reduce the condition in which wireless communication using the WFD protocol may be established unnecessarily before scanning is completed.

When scanning has not been completed at the time of the establishment of the wireless communication using the WFD protocol, the wireless communication using the WFD protocol may be disconnected and it may wait for the elapse of the predictive waiting time again. Thus, this configuration may further reduce the condition in which wireless communication using the WFD protocol may be established unnecessarily.

In particular configurations, the MFP 200 may calculate the predictive waiting time. Nevertheless, in other configurations, for example, the mobile device 100 may calculate the predictive waiting time. Consequently, the processing performance information may be shifted from the MFP 200 to the mobile device 100. When scanning has already been started, one or more of the reading method (e.g., flatbed reading or ADF reading) and the number of remaining documents may be transmitted.

In particular configurations, the MFP 200 may calculate the predictive waiting time in step S151 or in steps S151 and S173. Nevertheless, in other configurations, for example, the waiting time may be predetermined. In this case, the predetermined waiting time may be set in one of the mobile device 100 and the MFP 200. When the waiting time is set in the mobile device 100, it may be unnecessary to transmit the waiting time to the MFP 200. When the waiting time is predetermined, a new waiting time (e.g., second or subsequent waiting times) to be calculated in response to an incompletion response may be set to be less than a waiting time (e.g., a first waiting time) set for first waiting after receipt of a handover response. That is, because there is a greater possibility to complete scanning earlier during the second or subsequent waiting, it may be preferable that the second or subsequent waiting times be set to be less than the first waiting time. In other configurations, for example, the predictive waiting time may be used for the first waiting time, and the predetermined waiting time may be added for fine adjustment as the second or subsequent waiting times.

In particular configurations, the predictive waiting time may be added to all the handover responses. Nevertheless, in other configurations, for example, it may be determined which one of the predictive waiting time and the predetermined waiting time is transmitted as a response, based on whether scanning has been started at the time of receipt of a handover request. That is, when scanning has not yet been started, a waiting time for waiting for an input of a scan execution instruction may occur. Therefore, accuracy of the predictive waiting time may be degraded if the predetermined waiting time is transmitted. Thus, a predictive waiting time may be calculated and transmitted when scanning has been started, and the predetermined waiting time may be transmitted when scanning has not been started.

In step S164, it may be determined whether scanning has been completed, (e.g., whether there are image data of all pages). Nevertheless, in other configurations, for example, it may be determined whether there are image data of at least one page, (e.g., whether there are a certain amount or more of image data). Thus, it may be determined whether image data of all pages have been transmitted after transmission of image data is completed. When image data of all pages have not been transmitted, wireless communication using the WFD protocol may be disconnected and the routine may wait until it is determined again that there are a certain amount or more of image data or scanning of all pages has been completed.

Figure 7:
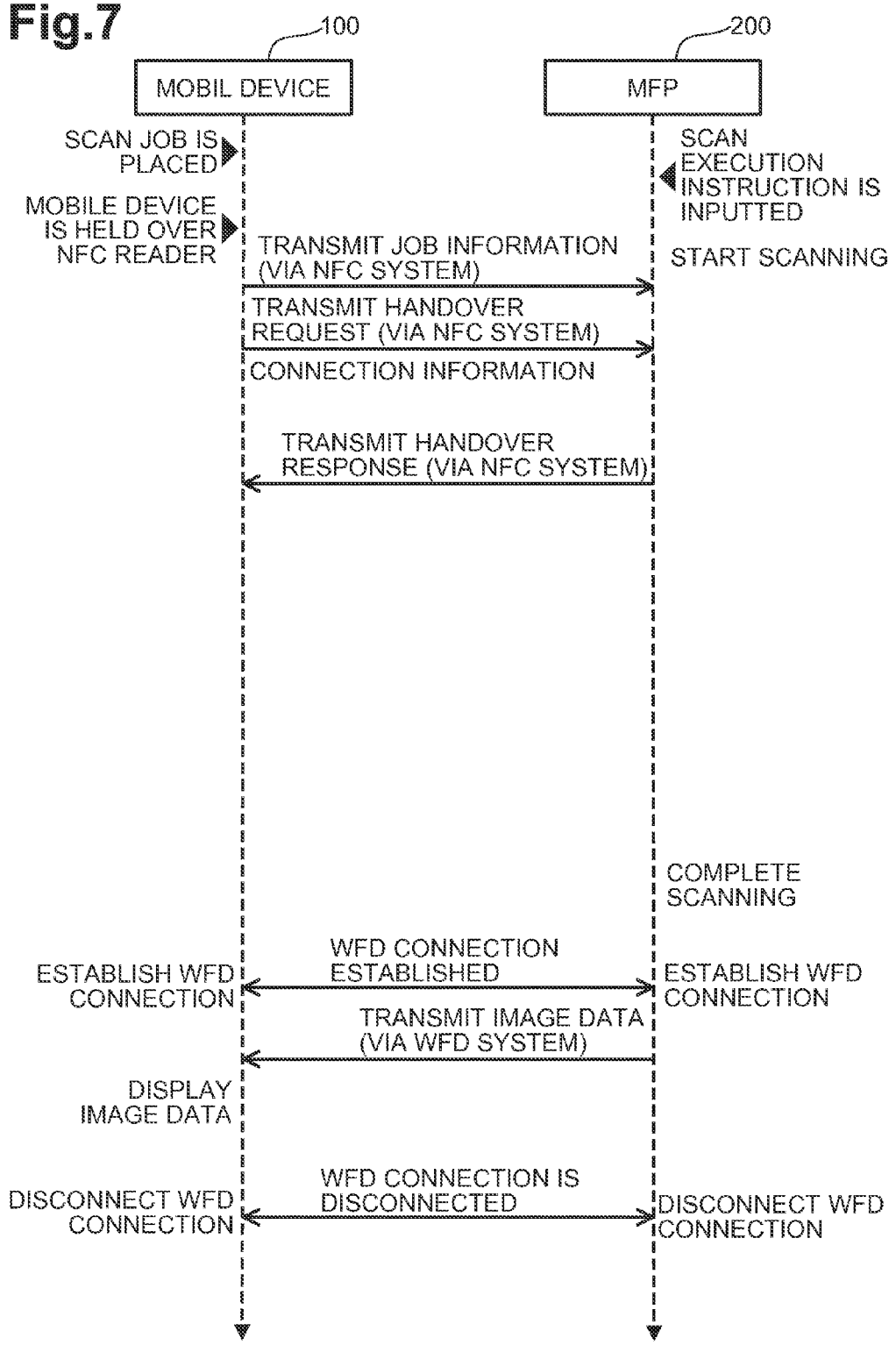
FIG. 7 is a sequence diagram showing an example process of data communication performed between the mobile device and the MFP during a scanning process, wherein the mobile device serves as the group owner.

Certain configurations in which the mobile device 100 may serve as the group owner now are described with reference to a sequence diagram shown in FIG. 7. Similar configurations described above, the mobile device 100 may be held over the NFC reader portion 43 of the MFP 200 while a scan job is placed in the mobile device 100.

When the wireless communication using the NFC protocol is established between the mobile device 100 and the MFP 200, the mobile device 100 may transmit job information to the MFP 200. When the wireless communication using the NFC protocol is established, the mobile device 100 may transmit a handover request to the MFP 200. The connection information used to establish wireless communication using the WFD protocol may be added to the handover request. This may be different from the configurations described above in which the connection information may be transmitted from the MFP 200. Upon receipt of a handover request from the mobile device 100, the MFP 200 may transmit a handover response to the mobile device 100.

Further, the MFP 200 may accept an input of a scan execution instruction through an operation performed on the operation panel 40. After accepting the input of the scan execution instruction, the MFP 200 may start scanning of one or more documents in the image reading portion 11. The scan execution instruction may be input before or after the mobile device 100 is held over the NFC reader 43.

After scanning is completed, the MFP 200 may request the mobile device 100 to establish a connection using the WFD protocol with the MFP 200 and may use the connection information to establish wireless communication using the WFD protocol with the mobile device 100. After establishing the wireless communication using the WFD protocol, the MFP 200 may start the transmission of image data. After completing the transmission of the image data, the MFP 200 may disconnect the wireless communication using the WFD protocol established with the mobile device 100. Thus, a series of operations for the scan job may be completed.

Figure 8:
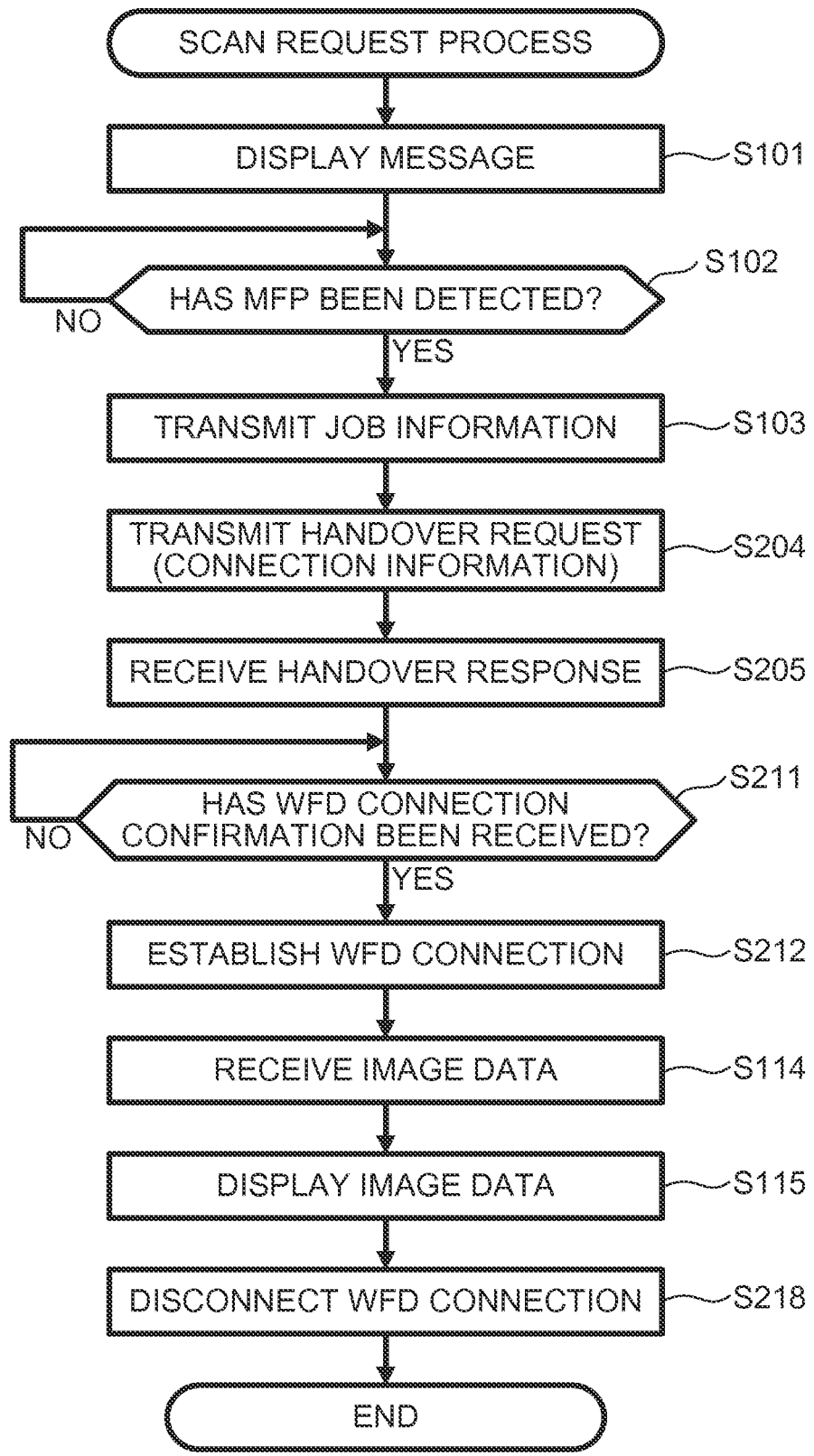
FIG. 8 is a flowchart showing an example scan request process performed by the mobile device in the process of data communication shown in FIG. 7.

Next, a scan request process performed by the mobile device 100 to implement the operations for the scan job according to certain configurations now are described with reference to a flowchart shown in FIG. 8. The same step numbers are assigned in FIG. 8 to the steps that are the same as the steps in FIG. 5 of the scan request process.

In the scan request process, the CPU 51 may display a message prompting for the mobile device 100 to be held over the NFC reader portion 43 of the MFP 200 (e.g., step S101). Subsequent to step S101, the CPU 51 may determine whether an MFP 200 that may be a destination of a scan job has been detected (e.g., step S102). While the destination MFP 200 is not detected (e.g., NO in step S102), the routine may wait until the CPU 51 determines that the destination MFP 200 has been detected. When the CPU 51 determines that the destination MFP 200 has been detected (e.g., YES in step S102), the CPU 51 may transmit job information to the MFP 200 via the NFC I/F 57 (e.g., step S103).

Therefore, the CPU 51 may transmit a handover request from the mobile device 100 to the MFP 200 (e.g., step S204). Subsequent to step S204, the CPU 51 may receive a handover response from the MFP 200 (e.g., step S205). In certain configurations, the mobile device 100 may serve as the group owner. Therefore, the connection information may be added to the handover request transmitted in step S204 and the connection information might not be added to a handover response. When the mobile device 100 has not started processing as the group owner at the time of step S205, the mobile device 100 may start processing as the group owner.

Subsequent to step S205, the CPU 51 may determine whether a WFD connection confirmation has been received from the MFP 200 (e.g., step S211). When the CPU 51 determines that a WFD connection confirmation has not been received (e.g., NO in step S211), the routine may wait until the CPU 51 determines that a WFD connection confirmation has been received. When the CPU 51 determines that a WFD connection confirmation has been received (e.g., YES in step S211), the CPU 51 may establish wireless communication using the WFD protocol with the MFP 200 (e.g., step S212).

Subsequent to step S212, the CPU 51 may receive image data from the MFP 200 (e.g., step S114). Then, the CPU 51 may display the received image data via the application 20 (e.g., step S115). Subsequent to step S115, the CPU 51 may disconnect the wireless communication using the WFD protocol established with the MFP 200 after receiving a disconnection confirmation from the MFP 200 (e.g., step S218). At that time, when the CPU 51 has started processing as the group owner in step S205, the CPU 51 may end the processing as the group owner. Subsequent to step S218, the CPU 51 may end the scan request process.

Figure 9:
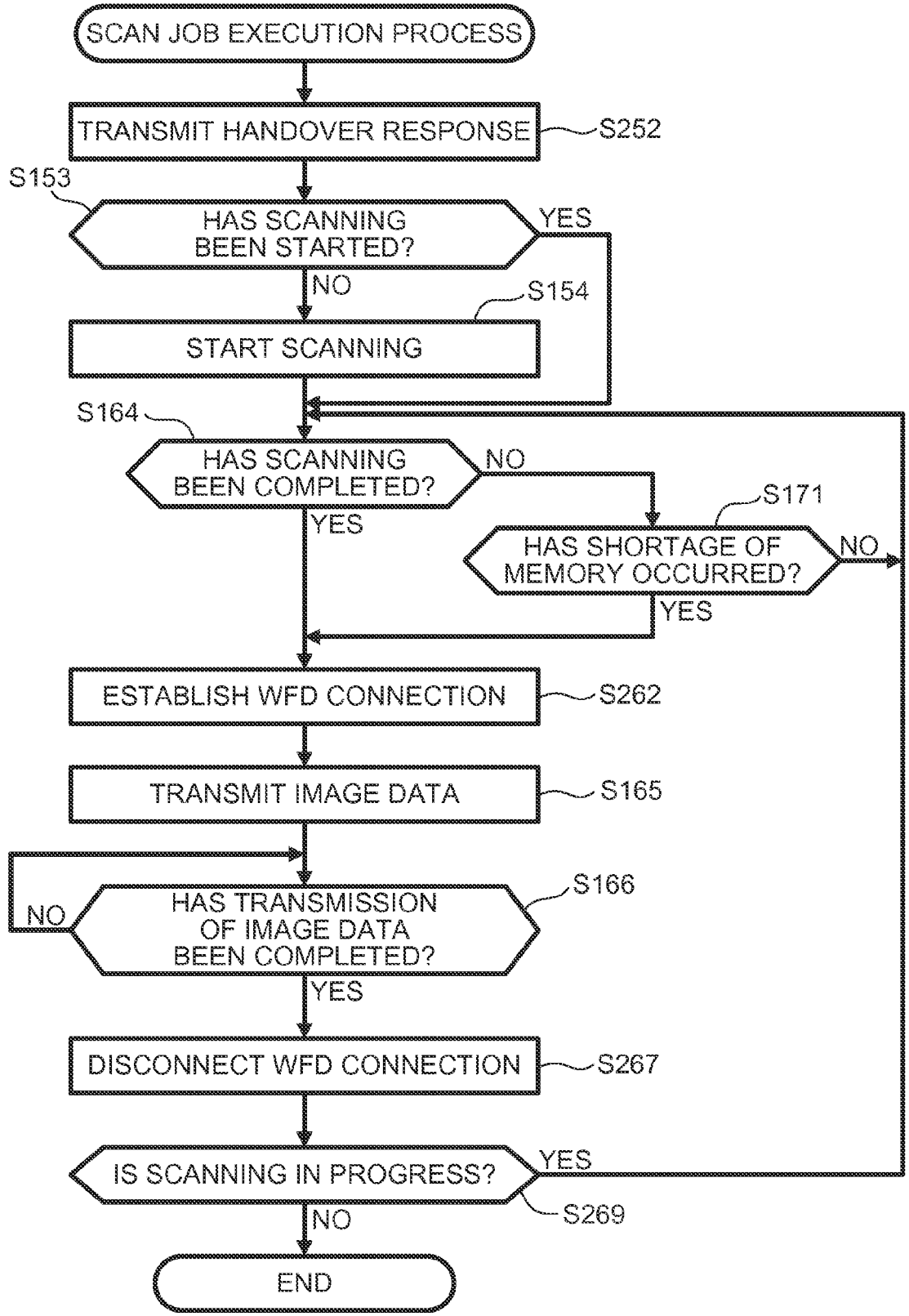
FIG. 9 is a flowchart depicting an example scan job execution process performed by the MFP in the process of data communication shown in FIG. 7.

A scan job execution process performed by the MFP 200 to implement the operations for the scan job according to certain configurations now is described with reference to a flowchart shown in FIG. 9. The same step numbers are assigned in FIG. 9 to the steps that are the same as the steps in FIG. 6 of the scan job execution process described above.

In the scan job execution process, the CPU 51 may transmit a handover response to the mobile device 100 via the NFC I/F (e.g., step S252). In certain configurations, the mobile device 100 may serve as the group owner. Therefore, the connection information might not be added to the handover response. On the other hand, the connection information may be added to the handover request. Thus, the MFP 200 may have already received the connection information in connection with the start of the scan job execution process.

Subsequent to step S252, the CPU 31 may determine whether scanning has been started (e.g., step S153). When the CPU 31 determines that scanning has not been started yet (e.g., NO in step S153), the CPU 31 may start scanning after accepting an input of a scan execution instruction (e.g., step S154). Subsequent to step S154 or when the CPU 31 determines that scanning has been started (e.g., YES in step S153), the CPU 31 may determine whether scanning has been completed (e.g., step S164).

When the CPU 31 determines that scanning has not been completed (e.g., NO in step S164), the CPU 31 may determine whether a shortage of memory has occurred in the MFP 200 (e.g., step S171). When the CPU 31 determines that a shortage of memory has not occurred (e.g., NO in step S171), the routine may proceed to step S164 and wait until scanning has been completed.

When the CPU 31 determines that scanning has been completed (e.g., YES in step S164) or when the CPU 31 determines that a shortage of memory has occurred (e.g., YES in step S171), the CPU 31 may use the connection information to establish wireless communication using the WFD protocol with the mobile device 100 (e.g., step S262). Then, the CPU 31 may start the transmission of image data to the mobile device 100 (e.g., step S165).

Thereafter, the CPU 31 may determine whether image data of all pages has been transmitted (e.g., step S166). When the CPU 31 determines that image data of all pages has not been transmitted (e.g., NO in step S166), the routine may wait until the CPU 31 determines that image data of all pages has been completed. When the CPU 31 determines that image data of all pages has been completed (e.g., YES in step S166), the CPU 31 may transmit a disconnection confirmation to the mobile device 100 and disconnect the wireless communication using the WFD protocol (e.g., step S267).

Subsequent to step S267, the CPU 31 may determine whether scanning is currently in progress (e.g., step S269). When the CPU 31 determines that a shortage of memory has occurred in step S171, the transmission of the image data may be started before scanning is completed. Therefore, when the CPU 31 determines that scanning is currently in progress (e.g., YES in step S269), the routine may proceed to step S164 and wait until the CPU 31 determines that scanning has been completed. When the CPU 31 determines that scanning is not currently in progress (e.g., NO in step S269), the CPU 31 may determine that the transmission of the image data of all pages has been completed. Thus, the CPU 31 may end the scan job execution process.

As described above, in the operations for the scan job according to certain configurations, a handover might not be implemented until scanning is completed or the shortage of memory occurs and wireless communication using the WFD protocol may be established after scanning is completed. Therefore, this configuration may more accurately reduce the condition in which wireless communication using the WFD protocol may be established unnecessarily before scanning is completed, as compared with particular configurations in which wireless communication using the WFD protocol may be established based on the waiting time.

In certain configurations, one or more of the time that elapses until scanning is completed and the time that elapses until a shortage of memory occurs may be used as the waiting time. Nevertheless, in other configurations, for example, the waiting time may be predetermined. In this case, the predetermined waiting time may be set in one of the mobile device 100 and the MFP 200. The configuration using the predetermined waiting time may also reduce the likelihood that wireless communication using the WFD protocol may be established unnecessarily before scanning is completed, as compared with a case where a handover may be implemented immediately after the mobile device 100 receives a handover response.

In certain configurations, wireless communication using the WFD protocol may be established when scanning is completed or when a shortage of memory occurs. Nevertheless, in other configurations, for example, wireless communication using the WFD protocol may be established when a scanning start instruction is inputted or when one or more documents are loaded. In this case, the likelihood of an unnecessary connection before the scanning start instruction is input or documents are loaded may be reduced.

In step S164, it may be determined whether scanning has been completed, (e.g., that image data of all pages now exists). Nevertheless, in other configurations, for example, it may be determined whether there is image data of at least one page, (e.g., whether a certain amount of image data or more has been generated).

A procedure for performing data communication between the mobile device 100 and the MFP 200 after a print job is placed in the mobile device 100 via the application 20 is now described. In some configurations in which a print job may be executed, the MFP 200 may serve as the group owner while the MFP 200 was operated in a normal condition, the group owner may be switched to the mobile device 100 from the MFP 200 and the mobile device 100 may serve as the group owner temporarily while an error that may cause a printing failure has occurred in the MFP 200.

Figure 10:
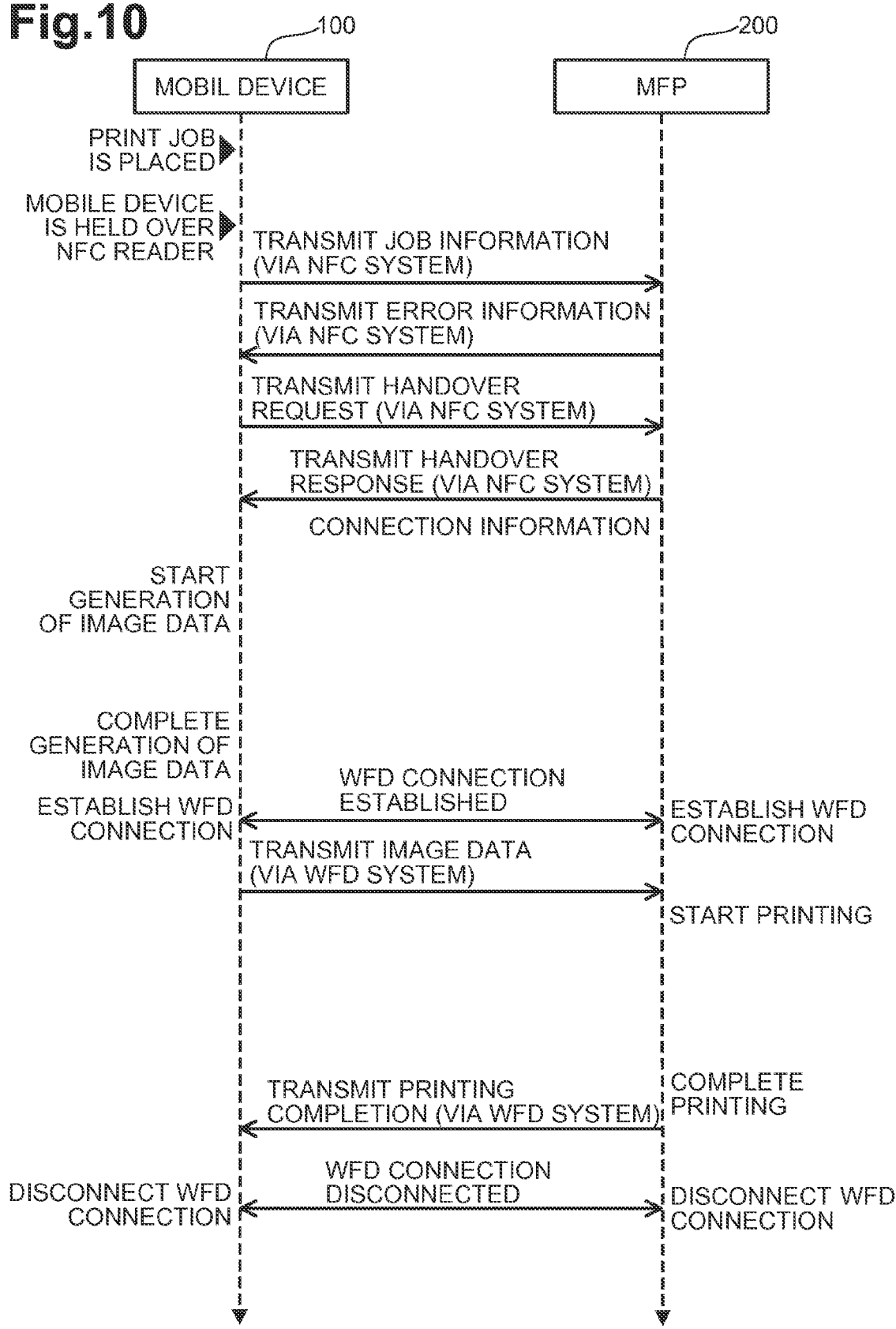
FIG. 10 is a sequence diagram showing an example process of data communication performed between the mobile device and the MFP in printing, wherein the MFP serves as the group owner.

A case in which the MFP 200 operates in the normal condition, (e.g., the MFP 200 serves as the group owner), now is described with reference to a sequence diagram shown in FIG. 10. The mobile device 100 may be held over the NFC reader portion 43 of the MFP 200 while a print job is placed in the mobile device 100. By doing so, the MFP 200 may detect the mobile device 100, and thus, wireless communication using the NFC protocol may be established between the mobile device 100 and the MFP 200.

When the wireless communication using the NFC protocol is established between the mobile device 100 and the MFP 200, the mobile device 100 may transmit job information to the MFP 200. Thus, the MFP 200 may identify the type of the job requested by the mobile device 100.

As the MFP 200 acquires the job information and identifies that the job is a print job, the MFP 200 may transmit error information of the MFP 200 to the mobile device 100. Thus, the mobile device 100 may recognize the execution availability of the print job in the MFP 200. The job information and the error information may be transmitted via wireless communication using the NFC protocol.

When the wireless communication using the NFC protocol is established, the mobile device 100 may transmit a handover request to the MFP 200. As the MFP 200 accepts the handover request from the mobile device 100, the MFP 200 may transmit a handover response to the mobile device 100. The connection information used to establish wireless communication using the WFD system may be added to the handover response. The handover request and the handover response may be transmitted via wireless communication using the NFC protocol.

Upon receipt of the handover response, the mobile device 100 may start the generation of image data for printing. After completing the generation of the image data, the mobile device 100 may request the MFP 200 to establish a connection using the WFD protocol and may use the connection information to establish wireless communication using the WFD protocol with the MFP 200. After establishing the wireless communication using the WFD protocol, the mobile device 100 may start the transmission of the image data. After completing the transmission of the image data, the mobile device 100 may disconnect the wireless communication using the WFD protocol established with the MFP 200 after receiving a printing completion response from the MFP 200.

After receiving the image data from the mobile device 100, the MFP 200 may start printing of the image data. After completing the printing of all pages, the MFP 200 may transmit a printing completion response to the mobile device 100 and disconnect the wireless communication using the WFD protocol established with the mobile device 100. Thus, a series of operations for the print job may be completed.

Figure 11:
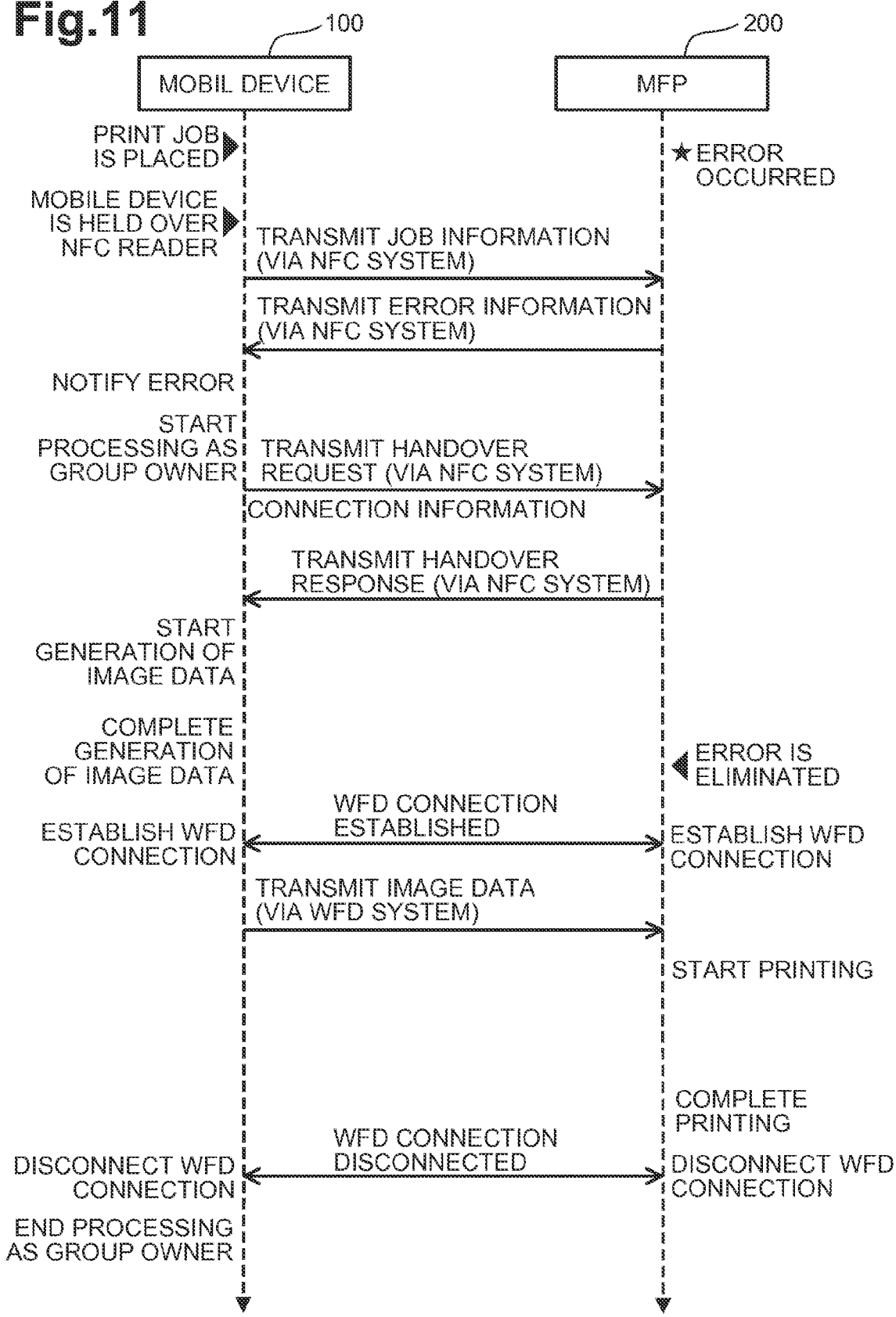
FIG. 11 is a sequence diagram showing an example process of data communication performed between the mobile device and the MFP in printing, wherein the mobile device serves as the group owner.

A case in which an error that may cause a printing failure has occurred in the MFP 200, (e.g., a case in which the mobile device 100 may serve as the group owner), is described with reference to a sequence diagram shown in FIG. 11. Similar to the case in which the MFP 200 may serve as the group owner, the mobile device 100 may be held over the NFC reader portion 43 of the MFP 200 while a print job is placed in the mobile device 100.

When the wireless communication using the NFC protocol is established between the mobile device 100 and the MFP 200, job information may be transmitted to the MFP 200 from the mobile device 100 and error information may be transmitted to the mobile device 100 from the MFP 200. Upon receipt from the MFP 200 of the error information representing that an error that may cause a printing failure, the mobile device 100 may display a message prompting action to eliminate the error on the operation panel 55 and start processing as the group owner. The error (e.g., an error state) that may cause a printing failure may comprise, for example, colorant empty or sheet empty.

Thereafter, the mobile device 100 may transmit a handover request to the MFP 200. At the time, the mobile device 100 may serve as the group owner. Thus, the connection information used to establish wireless communication using the WFD protocol may be added to the handover request. Upon receipt of the handover request from the mobile device 100, the MFP 200 may transmit a handover response to the mobile device 100.

Upon receipt of the handover response, the mobile device 100 may start the generation of image data for printing. Nevertheless, although the mobile device 100 may complete the generation of the image data, the mobile device 100 might not establish wireless communication using the WFD protocol with the MFP 200 until the mobile device 100 receives a connection request from the MFP 200.

After transmitting the handover response, the MFP 200 may wait for elimination of the error. After the error is eliminated, the MFP 200 may request the mobile device 100 to establish a connection using the WFD protocol. Thus, the MFP 200 may use the connection information to establish wireless communication using the WFD protocol with the mobile device 100.

After establishing the wireless communication using the WFD protocol, the mobile device 100 may start the transmission of the image data for printing. The MFP 200 may start printing of the received image data. After completing the printing of the image data, the MFP 200 may disconnect the wireless communication using the WFD protocol established with the mobile device 100. Further, the mobile device 100 may end the processing as the group owner. Thus, a series of operations of the print job may be completed.

Figure 12:
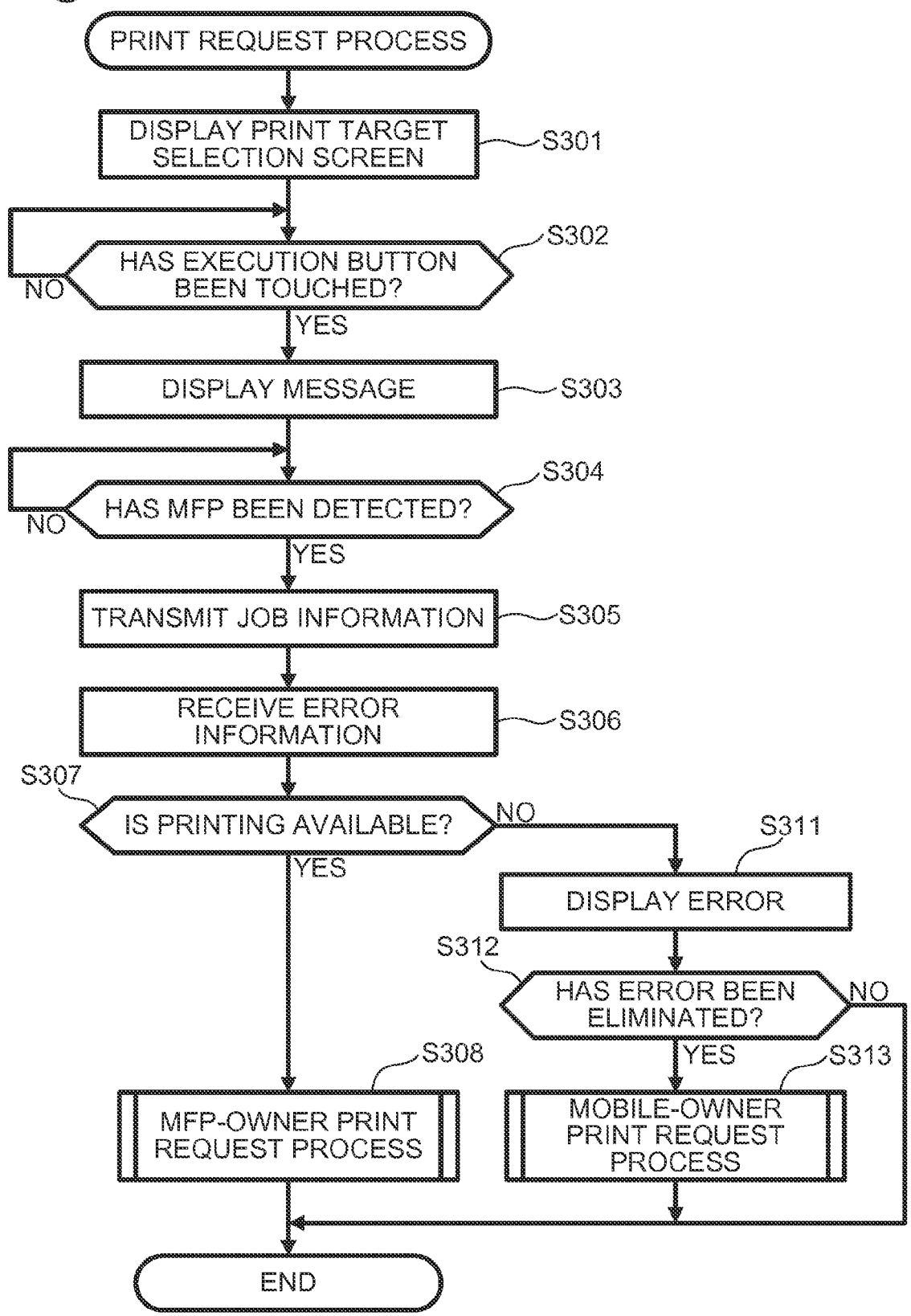
FIG. 12 is a flowchart showing an example print request process performed by the mobile device.

A print request process performed by the mobile device 100 to implement the above-described operations for the print job is described with reference to a flowchart shown in FIG. 12. The print request process may be performed by the CPU 51 when the "PRINTING" button 211 of the application 20 is selected (e.g., touched.)

In the print request process, the CPU 51 may display a print target selection screen for allowing the selection of print target data on the application 20 (e.g., step S301). Thereafter, the CPU 51 may determine whether print target data has been selected and whether an execution button displayed on the print target selection screen has been selected (e.g., step S302). When the CPU 51 determines that the execution button has not been selected (e.g., NO in step S302), the routine may wait until the CPU 51 determines that the execution button has been selected.

When the CPU 51 determines that the execution button has been selected (e.g., YES in step S302), the CPU 51 may display a message prompting for the mobile device 100 to be held over the NFC reader portion 43 of the MFP 200 (e.g., step S303). Subsequent to step S303, the CPU 51 may determine whether an MFP 200 that may be a destination of a print job has been detected (e.g., step S304). While the destination MFP 200 has not been detected (e.g., NO in step S304), the routine may wait until the CPU 51 determines that the destination MFP 200 has been detected.

When the CPU 51 determines that a destination MFP 200 has been detected (e.g., YES in step S304), the CPU 51 may transmit job information to the MFP 200 via the NFC I/F 57 (e.g., step S305). The CPU 51 may receive error information from the MFP 200 (e.g., step S306).

Thereafter, the CPU 51 may determine, based on the error information received in step S306, whether the MFP 200 is available for printing (e.g., step S307). When the CPU 51 determines that the MFP 200 is available for printing (e.g., YES in step S307), the CPU 51 may perform an MFP-owner print request process in which a print request may be made while the MFP 200 serves as the group owner (e.g., step S308). The CPU 51 may determine that the MFP 200 is available for printing when the MFP 200 is not in an error state (e.g., a sheet has jammed in the MFP 200, no sheets remain in the MFP 200, a shortage of one or more colorant or other recording material has occurred in the MFP 200).

When the CPU 51 determines that the MFP 200 is not available for printing (e.g., NO in step S307), the CPU 51 may display a message indicating that an error has occurred in the MFP 200 on the operation panel 55 (e.g., step S311). In other configurations, for example, a message comprising measures against the error (e.g., actions to correct the error) according to details of the error may be displayed. Thereafter, the CPU 51 may determine whether the error can be eliminated by a particular operation (e.g., step S312). For example, when the error has occurred due to a shortage of one or more colorants, the error may be eliminated by replacing one or more cartridges containing colorants with new ones. When the error has occurred due to a breakdown or failure of one or more parts or boards, it may be difficult to repair the MFP 200.

Thus, when the CPU 51 determines that the error can be eliminated by a particular operation (e.g., YES in step S312), the CPU 51 may perform a mobile-owner print request process in which a print request may be made while the mobile device 100 serves as the group owner (e.g., step S313). Subsequent to step S308 or S313 or when the CPU 51 determines that the error cannot be eliminated by a particular operation (e.g., NO in step S312), the CPU 51 may end the print request process.

Figure 13:
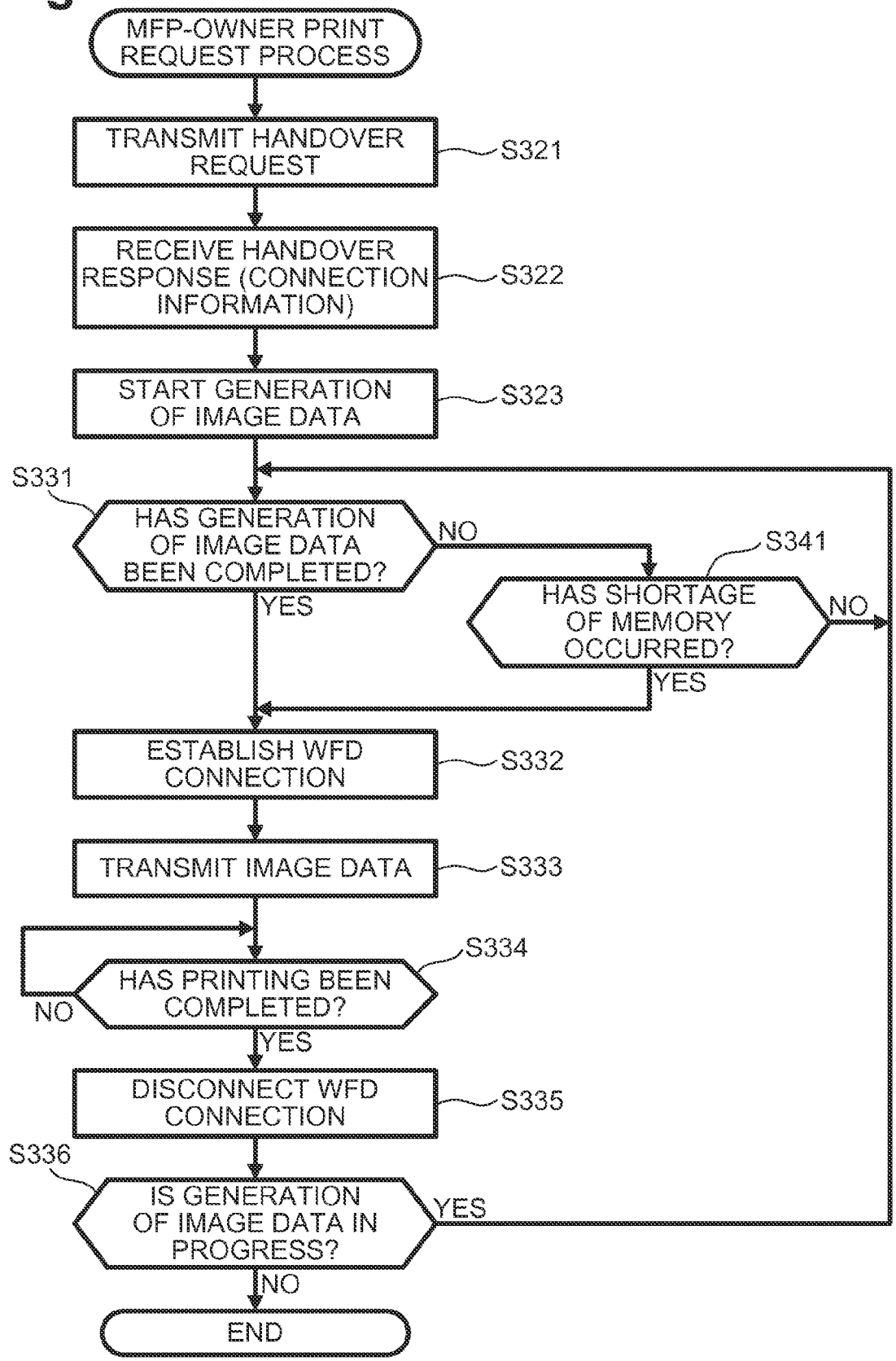
FIG. 13 is a flowchart showing an example MFP-owner print request process performed by the mobile device in the process of data communication shown in FIG. 10.

Hereinafter, the MFP-owner print request process in step S308 is described with reference to a flowchart shown in FIG. 13. The MFP-owner print request process may be based on the operations performed by the mobile device 100 in the sequence diagram shown in FIG. 10.

In the MFP-owner print request process, the CPU 51 may transmit a handover request to the MFP 200 (e.g., step S321). Subsequent to step S321, the CPU 51 may receive a handover response from the MFP 200 (e.g., step S322). The connection information used to establish wireless communication using the WFD protocol may be added to the handover response.

Subsequent to step S322, the CPU 51 may start the generation of image data for printing based on the data selected as a print target (e.g., step S323). Formats for image data for printing may comprise, for example, JPEG (an abbreviation for "Joint Photographic Experts Group"), PDF (an abbreviation for "Portable Document Format"), and TIFF (an abbreviation for "Tagged Image File Format"). Thereafter, the CPU 51 may determine whether the generation of the image data has been completed (e.g., step S331).

When the CPU 51 determines that the generation of the image data has not been completed (e.g., NO in step S331), the CPU 51 may determine whether a shortage of memory has occurred in the mobile device 100 (e.g., step S341). In step S341, the CPU 51 may determine how much free space is available in the RAM 55 or in a specific area allocated in the RAM 55 for storage of image data. When the CPU 51 determines that a shortage of memory has not occurred (e.g., NO in step S341), the routine may proceed to step S331 and wait until the CPU 51 determines that the generation of the image data has been completed.

When the CPU 51 determines that the generation of the image data has been completed (e.g., YES in step S331), or when the CPU 51 determines that a shortage of memory has occurred (e.g., YES in step S341), the CPU 51 may use the connection information received in step S322 to establish wireless communication using the WFD protocol with the MFP 200 (e.g., step S332). After the wireless communication using the WFD protocol is established, the CPU 51 may start the transmission of the image data for printing to the MFP 200 (e.g., step S333).

Subsequent to step S333, the CPU 51 may determine whether a printing completion response has been received from the MFP 200 (e.g., step S334). When the CPU 51 determines that a printing completion response has not been received (e.g., NO in step S334), the routine may wait until the CPU 51 determines that a printing completion response has been received. When the CPU 51 determines that a printing completion has been received (e.g., YES in step S334), the CPU 51 may transmit a disconnection confirmation to the MFP 200 and disconnect the wireless communication using the WFD protocol (e.g., step S335).

Subsequent to step S335, the CPU 51 may determine whether the generation of the image data is currently in progress (e.g., step S336). When the CPU 51 determines, in step S341, that a shortage of memory has occurred, the CPU 51 may start the transmission of the image data before completing the generation of the image data. Therefore, when the CPU 51 determines that the generation of the image data is currently in progress (e.g., YES in step S336), the routine may proceed to step S331 and wait until the CPU 51 determines that the generation of the image data has been completed. When the CPU 51 determines that the generation of the image data is not in progress (e.g., NO in step S336), the CPU 51 may determine that the generation of the image data of all pages has been completed. Thus, the CPU 51 may end the MFP-owner print request process.

Figure 14:
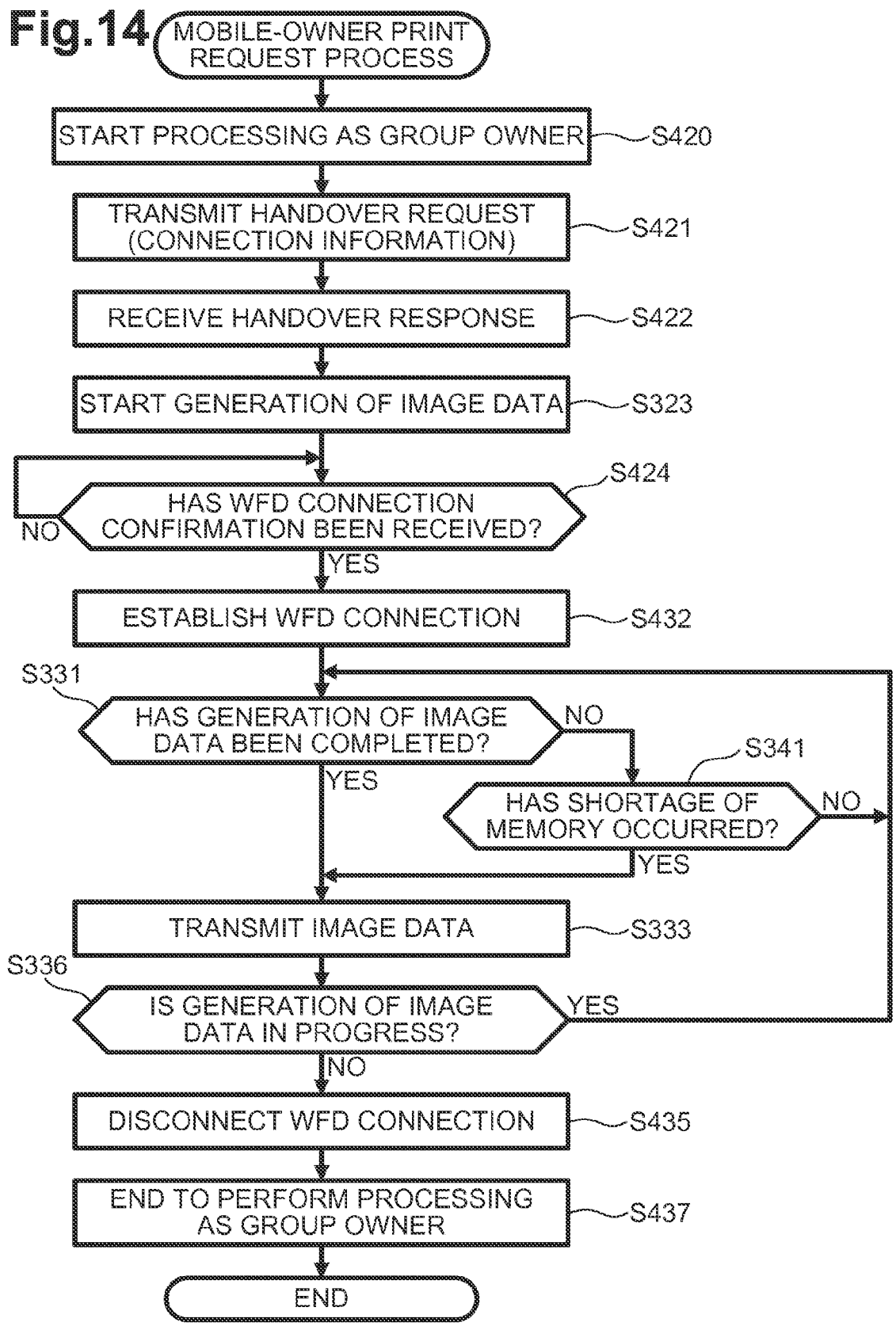
FIG. 14 is a flowchart showing an example mobile-owner print request process performed by the mobile device in the process of data communication shown in FIG. 11.

The mobile-owner print request process in step S313 now is described with reference to a flowchart shown in FIG. 14. The mobile-owner print request process may be based on the operations performed by the mobile device 100 in the sequence diagram shown in FIG. 11. The same step numbers are assigned in FIG. 14 to the steps that are the same as the steps in FIG. 13 of the MFP-owner print request process.

In the mobile-owner print request process, the CPU 51 may start processing as the group owner in wireless communication using the WFD protocol (e.g., step S420). Thereafter, the CPU 51 may transmit a handover request to the MFP 200 (e.g., step S421). At that time, the mobile device 100 may serve as the group owner. Therefore, the connection information used to establish wireless communication using the WFD protocol may be added to the handover request. Subsequent to step S421, the CPU 51 may receive a handover response from the MFP 200 (e.g., step S422).

Subsequent to step S422, the CPU 51 may start the generation of image data for printing based on data selected as a print target (e.g., step S323). Thereafter, the CPU 51 may determine whether a WFD connection confirmation has been received from the MFP 200 (e.g., step S424). When the CPU 51 determines that a WFD connection confirmation has not been received (e.g., NO in step S424), the routine may wait until the CPU 51 determines that a WFD connection confirmation has been received. When the CPU 51 determines that a WFD connection confirmation has been received (e.g., YES in step S424), the CPU 51 may establish wireless communication using the WFD protocol with the MFP 200 (e.g., step S432). That is, a handover of the wireless communication protocol from the NFC protocol to the WFD protocol may be implemented.

Subsequent to step S432, the CPU 51 may determine whether the generation of the image data has been completed (e.g., step S331). When the CPU 51 determines that the generation of the image data has not been completed (e.g., NO in step S331), the CPU 51 may determine whether a shortage of memory has occurred in the mobile device 100 (e.g., step S341). When the CPU 51 determines that a shortage of memory has not occurred (e.g., NO in step S341), the routine may proceed to step S331 and wait until the CPU 51 determines that the generation of the image data has been completed.

When the CPU 51 determines that the generation of the image data has been completed (e.g., YES in step S331) or when the CPU 51 determines that a shortage of memory has occurred (e.g., YES in step S341), the CPU 51 may start the transmission of the image data for printing to the MFP 200 (e.g., step S333).

Subsequent to step S333, the CPU 51 may determine whether the generation of the image data is currently in progress (e.g., step S336). When the CPU 51 determines that the generation of the image data is currently in progress (e.g., YES in step S336), the routine may proceed to step S331 and wait until the CPU 51 determines that the generation of the image data has been completed. When the CPU 51 determines that the generation of the image data is not in progress (e.g., NO in step S336), the generation of the image data of all pages has been completed. Thus, the CPU 51 may disconnect the wireless communication using the WFD protocol after receiving a disconnection confirmation from the MFP 200 (e.g., step S435). Subsequent to step S435, the CPU 51 may end the processing as the group owner in wireless communication using the WFD protocol (e.g., step S437) and further end the mobile-owner print request process.

Figure 15:
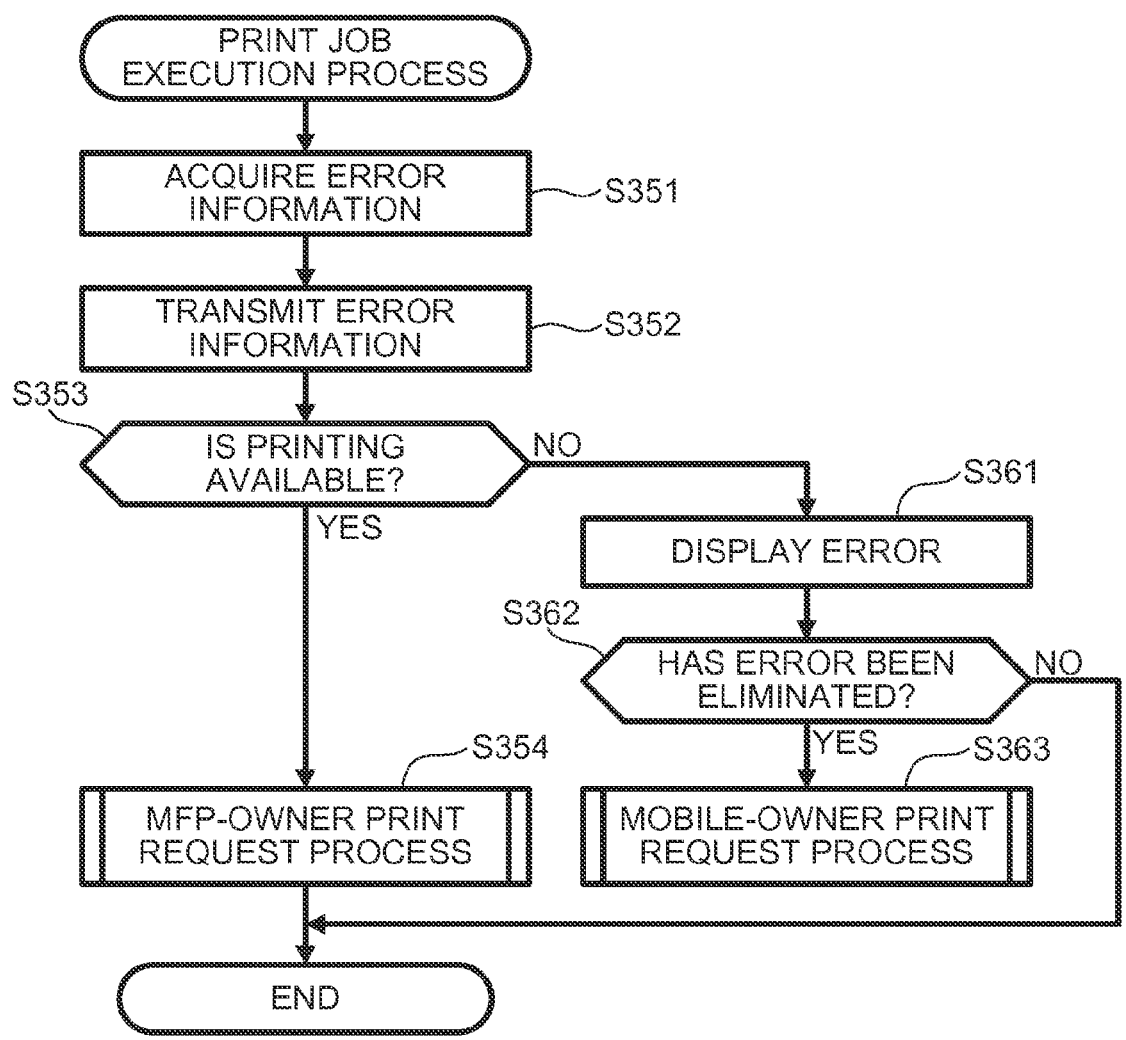
FIG. 15 is a flowchart showing an example print job execution process performed by the MFP.

A print job execution process performed by the MFP 200 to implement the above-described operations for the print job is described with reference to a flowchart shown in FIG. 15. The print job execution process may be performed by the CPU 31 when the CPU 31 detects an NFC-enabled device via the NFC I/F 37 and determines that a request to execute a print job has been made based on the job information included in the handover request transmitted from the mobile device 100. It may be assumed, in the description below, that the detected NFC-enabled device may be the mobile device 100.

In the print job execution process, the CPU 31 may acquire error information about an error occurring in the MFP 200 (e.g., step S351). Thereafter, the CPU 31 may transmit the error information acquired in step S351 to the mobile device 100 via the NFC I/F 37 (e.g., step S352).

After that, the CPU 31 may determine, based on the error information acquired in step S351, whether the MFP 200 is available for printing (e.g., step S353). When the CPU 31 determines that the MFP 200 is available for printing (e.g., YES in step S353), the CPU 31 may perform the MFP-owner print job execution process in which the MFP 200 may serve as the group owner (e.g., step S354).

When the CPU 31 determines that the MFP 200 is not available for printing (e.g., NO in step S353), the CPU 31 may display a message indicating that an error has occurred, on the operation panel 40 (e.g., step S361). In other configurations, for example, a message comprising measures against the error according to details of the error may be displayed. Thereafter, the CPU 31 may determine whether the error can be eliminated by a particular operation (e.g., step S362). When the CPU 51 determines that the error can be eliminated by a particular operation (e.g., YES in step S362), the CPU 31 may perform the mobile-owner print job execution process in which the mobile device 100 may serve as the group owner (e.g., step S363). Subsequent to step S354 or S363 or when the CPU 31 determines that the error cannot be eliminated by a particular operation (e.g., NO in step S362), the CPU 31 may end the print job execution process.

Figure 16:
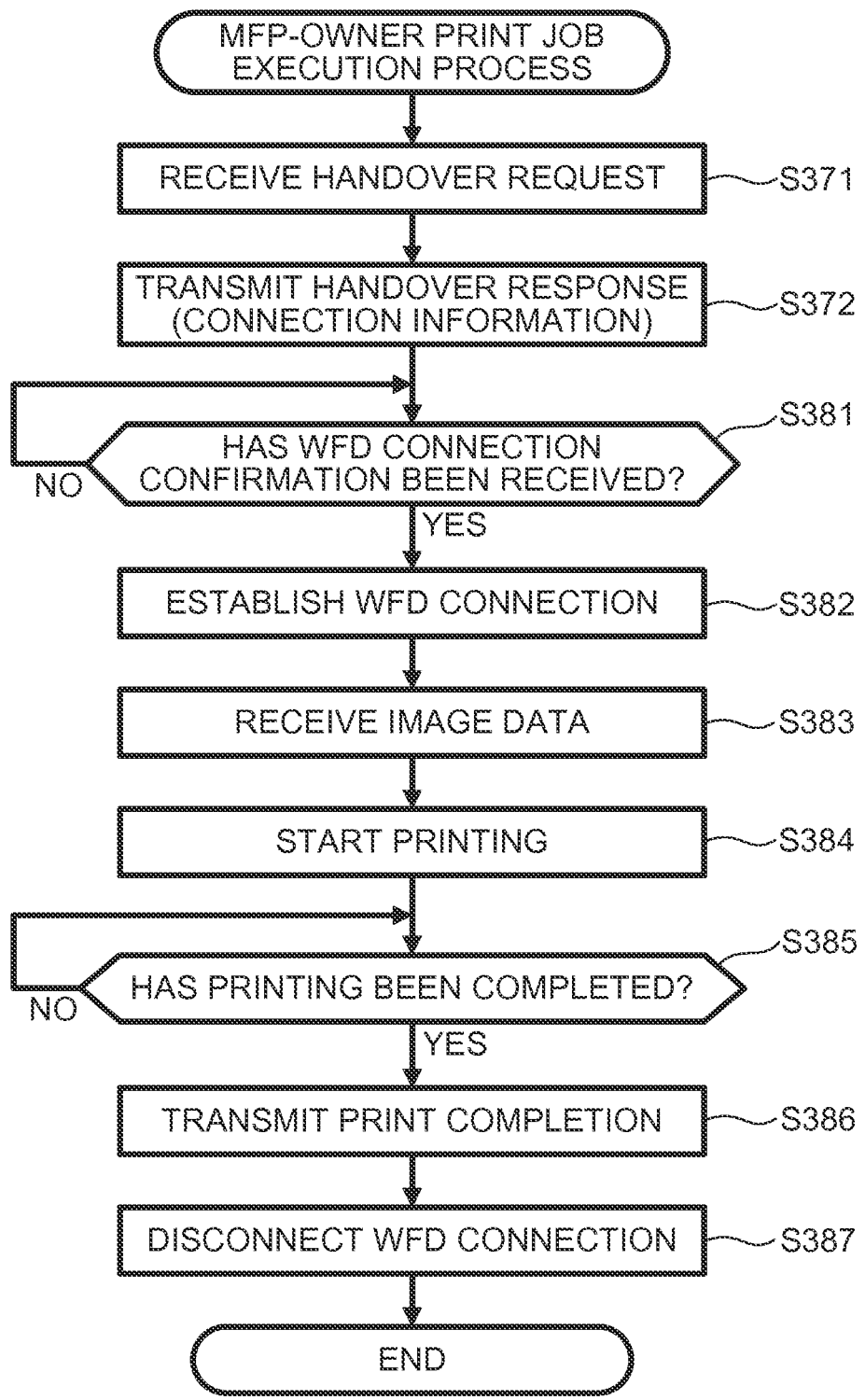
FIG. 16 is a flowchart showing an example MFP-owner print job execution process performed by the mobile device in the process of data communication shown in FIG. 10.

Hereinafter, the MFP-owner print job execution process in step S354 is described with reference to a flowchart shown in FIG. 16. The MFP-owner print job execution process may be based on the operations performed by the MFP 200 in the sequence diagram shown in FIG. 10.

In the MFP-owner print job execution process, the CPU 31 may receive a handover request from the mobile device 100 (e.g., step S371). Thereafter, the CPU 31 may transmit a handover response to the mobile device 100 (e.g., step S372). At that time, the MFP 200 may serve as the group owner. Therefore, the connection information may be added to the handover response.

Subsequent to step S372, the CPU 31 may determine whether a WFD connection confirmation has been received from the mobile device 100 (e.g., step S381). When the CPU 31 determines that a WFD connection confirmation has not been received (e.g., NO in step S381), the routine may wait until the CPU 31 determines that a WFD connection confirmation has been received. When the CPU 31 determines that a WFD connection confirmation has been received (e.g., YES in step S381), the CPU 31 may establish wireless communication using the WFD protocol with the mobile device 100 (e.g., step S382). That is, a handover of the wireless communication protocol from the NFC protocol to the WFD protocol may be implemented.

Subsequent to step S382, the CPU 31 may receive image data for printing from the mobile device 100 (e.g., step S383). Thereafter, the CPU 31 may allow the image forming portion 10 to start printing of the received image data for printing (e.g., step S384). Thereafter, the CPU 31 may determine whether the printing of all pages has been completed (e.g., step S385). When the CPU 31 determines that the printing of all pages has not been completed (e.g., NO in step S385), the routine may wait until the CPU 31 determines that the printing of all pages has completed.

When the CPU 31 determines that the printing of all pages has been completed (e.g., YES in step S385), the CPU 31 may transmit a printing completion response to the mobile device 100 (e.g., step S386). Subsequent to step S386, the CPU 31 may disconnect the wireless communication using the WFD protocol after receiving a disconnection confirmation from the mobile device 100 (e.g., step S387). Subsequent to step S387, the CPU 31 may end the MFP-owner print job execution process.

The mobile-owner print job execution process in step S363 is shown with reference to a flowchart shown in FIG. 17. The mobile-owner print job execution process may be based on the operations performed by the MFP 200 in the sequence diagram shown in FIG. 11. The same step numbers are assigned in FIG. 17 to the steps that are the same as the steps in FIG. 16 of the MFP-owner print request process.

In the mobile-owner print job execution process, the CPU 31 may receive a handover request from the mobile device 100 (e.g., step S471). At that time, the MFP 200 may serve as the group owner. Therefore, the connection information used to establish wireless communication using the WFD protocol may be added to the handover request. Subsequent to step S471, the CPU 31 may transmit a handover response to the mobile device 100 (e.g., step S472).

Subsequent to step S472, the CPU 31 may determine whether the error has been eliminated (e.g., step S481). For example, when the mobile device 100 serves as the group owner, the CPU 31 may determine when an error has occurred in the MFP 200. Therefore, the CPU 31 may confirm whether the error has been eliminated. When the CPU 31 determines that the error has not been eliminated (e.g., NO in step S481), the routine may wait until the CPU 31 determines that the error has been eliminated.

When the CPU 31 determines that the error has been eliminated (e.g., YES in step S481), the CPU 31 may use the connection information received in step S471 to establish wireless communication using the WFD protocol with the mobile device 100 (e.g., step S482).

Subsequent to step S482, the CPU 31 may receive image data for printing from the mobile device 100 (e.g., step S383). Thereafter, the CPU 31 may control the image forming portion 10 to print the received image data for printing (e.g., step S384). Thereafter, the CPU 31 may determine whether the printing of all pages has been completed (e.g., step S385). When the CPU 31 determines that the printing of all pages has not been completed (e.g., NO in step S385), the routine may wait until the CPU 31 determines that the printing of all pages has been completed.

When the CPU 31 determines that the printing of all pages has been completed (e.g., YES in step S385), the CPU 31 may transmit a disconnection confirmation to the mobile device 100 and disconnect the wireless communication using the WFD protocol (e.g., step S487). Subsequent to step S487, the CPU 31 may end the mobile-owner print job execution process.

As described above, in the operations for the print job according to some configurations, for example, when the MFP 200 serves as the group owner, a handover might not be implemented immediately after the mobile device 100 receives a handover response. Instead, wireless communication using the WFD protocol may be established after the generation of the image data for printing is completed. Therefore, this configuration may reduce the condition in which wireless communication using the WFD protocol may be established unnecessarily before the generation of the image data for printing is completed. Further, for example, when the mobile device 100 serves as the group owner, a handover might not be implemented until an error is eliminated. Instead, wireless communication using the WFD protocol may be established after printing becomes available. Thus, this configuration may reduce the likelihood that wireless communication using the WFD protocol is established unnecessarily while printing is not available.

In some configurations, a handover may be implemented after the generation of image data is completed or after an error is eliminated. Nevertheless, in other configurations, for example, a handover may be implemented after a predetermined waiting time elapses. In this case, the predetermined waiting time may be set in one of the mobile device 100 and the MFP 200.

In some configurations, when the MFP 200 serves as the group owner, wireless communication using the WFD protocol may be established when the generation of image data is completed or when a shortage of memory occurs. Nevertheless, in other configurations, for example, similar to the case where the mobile device 100 serves as the group owner, wireless communication using the WFD protocol may be established when it is determined that the image forming portion 10 is available for printing. In this case, an unnecessary connection may be avoided or reduced while printing is not available.

In some configurations, the group owner may be changed to the mobile device 100 when an error has occurred in the MFP 200. Nevertheless, in other configurations, for example, the group owner might not be changed to the mobile device 100. That is, one of the MFP 200 and the mobile device 100 may serve as the group owner permanently in this system.

In step S331, it may be determined whether the generation of image data has been completed, (e.g., whether there are image data of all pages). Nevertheless, in other configurations, for example, it may be determined whether there is image data of at least one page, (e.g., whether there exists a certain amount or more of image data). In this case, it may be determined whether image data of all pages has been transmitted after the transmission of the image data is completed. When the image data of all pages has not been transmitted, wireless communication using the WFD protocol may be disconnected and the routine may wait until it is determined again that there exists a certain amount or more of image data or the generation of image data of all pages is completed.

In some configurations, wireless communication using the WFD protocol may be disconnected when printing is completed. Nevertheless, in other configurations, for example, wireless communication using the WFD protocol may be disconnected when image data of the last page is received or transmitted.

As described above in detail, in the image processing system 900 according to configurations described above, wireless communication using the WFD protocol might not be established immediately after the connection information to be used for the connection establishment via wireless communication using the WFD protocol (an example of long-range communication) is transmitted and received via wireless communication using the NFC protocol (an example of short-range communication). Instead, wireless communication using the WFD protocol may be established when an image transmission condition for transmitting image data (e.g., the elapse of the predictive waiting time in particular configurations, the completion of scanning in certain configurations, and the completion of the generation of image data for printing or the elimination of an error in some configurations) is satisfied. With this configuration, the time during which wireless communication using the WFD protocol may be established may be shortened in accordance with the waiting time that elapses before the transmission of image data to be communicated is available. As a result of this, the likelihood of an unnecessary connection using the WFD protocol may be reduced or the time of such an unnecessary connection may be shortened before the transmission of the image data is started.

While the disclosure has been described in detail with reference to the specific configurations thereof, such configurations are merely examples, and various changes, arrangements and modifications may be applied therein without departing from the spirit and scope of the disclosure. In other configurations, for example, the information processing apparatus for inputting a job may be any device that may perform wireless communication and have a function of controlling the image processing apparatus. The mobile device 100 may be, for example, a smartphone or a tablet PC. Further, the image processing apparatus may be any device that may have the image processing function, e.g., a copying machine, a printer, a scanner, or a facsimile machine, as well as a multifunction peripheral, such as the MFP 200).

In configurations described herein, the NFC protocol may be adopted as the short-range communication, the WFD protocol may be adopted as the long-range communication, and the handover from the NFC protocol to the WFD protocol may be implemented. Nevertheless, the communication protocol for implementing the handover is not limited to the protocols set forth herein. Different communication protocols that have different communication ranges or protocols may be adopted. For example, in other configurations, Bluetooth® protocols, TransferJet protocols, or Wi-Fi® protocols (e.g., a system for non-direct communication using an access point), may be adopted as the communication protocol.

The processes disclosed in the above-described configurations may be performed by a single CPU, a plurality of CPUs, hardware, such as, for example, a special application specific integrated circuit ("ASIC"), or a combination of a CPU and an ASIC. Further, the processes disclosed in the above-described configurations may be implemented by various manners, such as, for example, by executing one or more computer-readable instructions stored on computer-readable storage media or by other methods.

While the invention has been described in connection with various exemplary structures and illustrative configurations, it will be understood by those skilled in the art that other variations and modifications of the structures, configurations, and embodiments disclosed above may be made without departing from the scope of the invention. For example, this application comprises each and every possible combination of the various elements and features disclosed and incorporated by reference herein, and the particular elements and features presented in the claims and disclosed and incorporated by reference above may be combined with each other in each and every possible way within the scope of the application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A data processing apparatus comprising:
a controller comprising one or more control devices;
a communication device configured to communicate using a first communication protocol; and
an other communication device configured to communicate using a second communication protocol,
wherein the controller is configured to control the communication device to communicate with an external device using the first communication protocol to transmit connection information between the communication device and the external device, the connection information comprising information for establishing communication using the second communication protocol,
wherein the controller is configured to determine whether an image transmission condition for transferring image data between the data processing apparatus and the external device is satisfied,
wherein the controller is configured to control the other communication device to communicate with the external device using the second communication protocol after the connection information is used to establish communication between the other communication device and the external device using the second communication protocol in response to the controller determining that the image transmission condition is satisfied,
wherein the communication between the other communication device and the external device using the second communication protocol comprises at least one of:
transmitting the image data from the other communication device to the external device; and
receiving the image data by the other communication device from the external device,
wherein the controller is configured to determine whether a portion of the image data generated is greater than or equal to a predetermined value after a predetermined waiting time from when communication between the other communication device and the external device using the first communication protocol is established,
wherein the controller is configured to control the other communication device to disconnect communication with the external device using the second communication protocol in response to determining that the portion of the image data generated is not greater than or equal to the predetermined value after the predetermined waiting time,
wherein the controller is configured to determine whether an other waiting time from when the other communication device disconnected communication with the external device using the second communication protocol is greater than or equal to an other predetermined time, and
wherein the controller is configured to control the other communication device to reestablish communication with the external device using the second communication protocol in response to determining that the other waiting time is greater than or equal to the other predetermined time.

2. The data processing apparatus according to claim 1, further comprising an image processing device configured to perform image processing for at least one of:
printing print image data, which is transmitted from the external device, and
generating scanning image data, which is read from a document and transmitted to the external device.

3. The data processing apparatus according to claim 2, wherein the image transmission condition is satisfied when the image processing device is available for performing image processing.

4. The data processing apparatus according to claim 2, wherein the image transmission condition is satisfied when the image processing device is not in an error state.

5. The data processing apparatus according to claim 1, wherein the image transmission condition is satisfied when a portion of the image data generated is greater than or equal to the predetermined value.

6. The data processing apparatus according to claim 1, further comprising a memory configured to store the image data, wherein the image transmission condition is satisfied when an amount of free space in the memory becomes less than or equal to a predetermined amount.

7. The data processing apparatus according to claim 1, wherein the image transmission condition is satisfied when a waiting time, from a time when communication between the other communication device and the external device using the first communication protocol is established, becomes greater than or equal to a predetermined time.

8. A non-transitory computer-readable medium storing computer-readable instructions that, when executed by a processor of a data processing apparatus, instruct the processor to perform processes comprising:
controlling a communication device to communicate with an external device using the first communication protocol to transmit connection information between the communication device and the external device, the connection information comprising information for establishing communication using the second communication protocol,
determining whether an image transmission condition for transferring image data between the data processing apparatus and the external device is satisfied,
controlling an other communication device to communicate with the external device using the second communication protocol after the connection information is used to establish communication between the other communication device and the external device using the second communication protocol in response to determining that the image transmission condition is satisfied, wherein the communication between the other communication device and the external device using the second communication protocol comprises at least one of:
  transmitting the image data from the other communication device to the external device; and
  receiving the image data by the other communication device from the external device, and wherein the computer-readable instructions, when executed by the processor, instruct the processor to perform further processes comprising:
  determining whether a portion of the image data generated is greater than or equal to a predetermined value after a predetermined waiting time from when communication between the other communication device and the external device using the first communication protocol is established,
  controlling the other communication device to disconnect communication with the external device using the second communication protocol in response to determining that the portion of the image data generated is not greater than or equal to the predetermined value after the predetermined waiting time,
  determining whether an other waiting time from when the other communication device disconnected communication with the external device using the second communication protocol is greater than or equal to an other predetermined time, and
  controlling the other communication device to reestablish communication with the external device using the second communication protocol in response to determining that the other waiting time is greater than or equal to the other predetermined time.

9. The non-transitory computer-readable medium according to claim 8, wherein the computer-readable instructions further instruct the processor to control an image processing device to perform image processing for at least one of:
  printing print image data, which is transmitted from the external device, and
  generating scanning image data, which is read from a document and transmitted to the external device.

10. The non-transitory computer-readable medium according to claim 9, wherein the image transmission condition is satisfied when the image processing device is available for performing image processing.

11. The non-transitory computer-readable medium according to claim 9, wherein the image transmission condition is satisfied when the image processing device is not in an error state.

12. The non-transitory computer-readable medium according to claim 8, wherein the image transmission condition is satisfied when a portion of the image data generated is greater than or equal to the predetermined value.

13. The non-transitory computer-readable medium according to claim 8, wherein the computer-readable instructions further instruct the processor to store the image data in a memory, wherein the image transmission condition is satisfied when an amount of free space in the memory becomes less than or equal to a predetermined amount.

14. The non-transitory computer-readable medium according to claim 8, wherein the image transmission condition is satisfied when a waiting time, from a time when communication between the other communication device and the external device using the first communication protocol is established, becomes greater than or equal to a predetermined time.

* * * * *